United States Patent [19]
Munekawa et al.

[11] Patent Number: 6,025,551
[45] Date of Patent: *Feb. 15, 2000

[54] FINGERING INFORMATION ANALYZER AND ELECTRONIC MUSICAL INSTRUMENT WITH THE SAME

[75] Inventors: Hiroshi Munekawa, Hyougo-ken; Motoichi Tamura, Shizuoka-ken; Tokuji Hayakawa, Shizuoka-ken; Takeo Shibukawa, Shizuoka-ken; Eiichiro Aoki, Shizuoka-ken; Akira Nakada, Shizuoka-ken, all of Japan

[73] Assignee: Yamaha Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/408,019

[22] Filed: Mar. 22, 1995

[30] Foreign Application Priority Data

Mar. 23, 1994  [JP]  Japan ..................... 6-051517

[51] Int. Cl.[7] ......................................... G09B 15/02
[52] U.S. Cl. ........................ 84/477 R; 84/485 R
[58] Field of Search ................... 84/477 R, 478, 84/485 R

[56] References Cited

U.S. PATENT DOCUMENTS 1,324,274  12/1919  Schantz ..................... 84/485 R

FOREIGN PATENT DOCUMENTS

| | | |
|---|---|---|
| 56-27189 | 3/1981 | Japan . |
| 56-65191 | 6/1981 | Japan . |
| 60-46432 | 10/1985 | Japan . |
| 63-36346 | 9/1988 | Japan . |
| 1-179072 | 7/1989 | Japan . |
| 03085581A | 4/1991 | Japan . |
| 03184076A | 8/1991 | Japan . |
| 3-89466 | 9/1991 | Japan . |
| 3-89467 | 9/1991 | Japan . |
| 5-14912 | 2/1993 | Japan . |
| 06075568A | 3/1994 | Japan . |

Primary Examiner—Stanley J. Witkowski
Attorney, Agent, or Firm—Rossi & Associates

[57] ABSTRACT

In a fingering information analyzer, tone pitch information indicative of each tone pitch of a series of musical notes supplied from a flexible disc or a performance information memory is analyzed to produce fingering information indicative of a performance finger for each of the musical notes. The fingering information is mixed with the tone pitch information and memorized in a fingering memory. When the fingering information is reproduced, a performance finger for each of the musical notes is determined in accordance with a changing direction or variation width of the tone pitch information continual in time series and a changing condition of white and black keys based on the tone pitch information. The tone pitch information and fingering information memorized in the fingering memory is read out in accordance with progression of a musical tune and adapted for performance of the keys on a keyboard and for indication of the performance finger.

4 Claims, 18 Drawing Sheets

TBLA (TR, X, FN)

| KTYP \ FN | W/W 0 | W/B 1 | B/W 2 | B/B 3 |
|---|---|---|---|---|
| 1 | 2 | 2 | 3 | 2 |
| 2 | 3 | 6 (TN) | 3 | 3 |
| 3 | 7 (TN) | 1 | 4 | 4 |
| 4 | 1 | 1 | 5 | 5 |
| 5 | 2 | 2 | 2 | 2 |

TBLB (TM, SC, UD)

| SC \ UD | 0 | 1 |
|---|---|---|
| 0 | 1 | 3 |
| 1 | 1 | 3 |
| 2 | 1 | 3 |

FIG.4(A)

| PERFORMANCE INFORMATION MEMORY | ⭘ 30a |
|---|---|
| KEY-EVENT CODE | ⎫ KEY-EVENT DATA |
| KEY-CODE | |
| GATE TIME | |
| DURATION CODE | ⎱ DURATION EVENT DATA |
| DURATION TIME | |
| KEY-EVENT CODE | |
| KEY-CODE | |
| GATE TIME | |
| DURATION CODE | |
| DURATION TIME | |
| ・・ | |
| PHRASE CODE | |
| ・・ | |
| END CODE | |

FIG.4(B)

| CHARACTER MEMORY | ⭘ 30b |
|---|---|
| KEY-EVENT CODE | ⎫ KEY-EVENT DATA |
| KEY-CODE | |
| GATE TIME | |
| DURATION CODE | ⎱ DURATION EVENT DATA |
| DURATION TIME | |
| CHARACTER CODE | ⎫ CHARACTER CODE |
| SCALE DATA | |
| UP-DOWN DATA | |
| KEY-TYPE DATA | |
| KEY-EVENT CODE | |
| KEY-CODE | |
| ・・ | |
| PHRASE CODE | |
| ・・ | |
| END CODE | |

FIG.4(C)

| FINGERING MEMORY | ⭘ 30c |
|---|
| KEY-EVENT CODE |
| KEY-CODE |
| GATE TIME |
| FINGER NUMBER |
| DURATION CODE |
| DURATION TIME |
| KEY-EVENT CODE |
| KEY-CODE |
| GATE TIME |
| FINGER NUMBER |
| ・・ |
| PHRASE CODE |
| ・・ |
| END CODE |

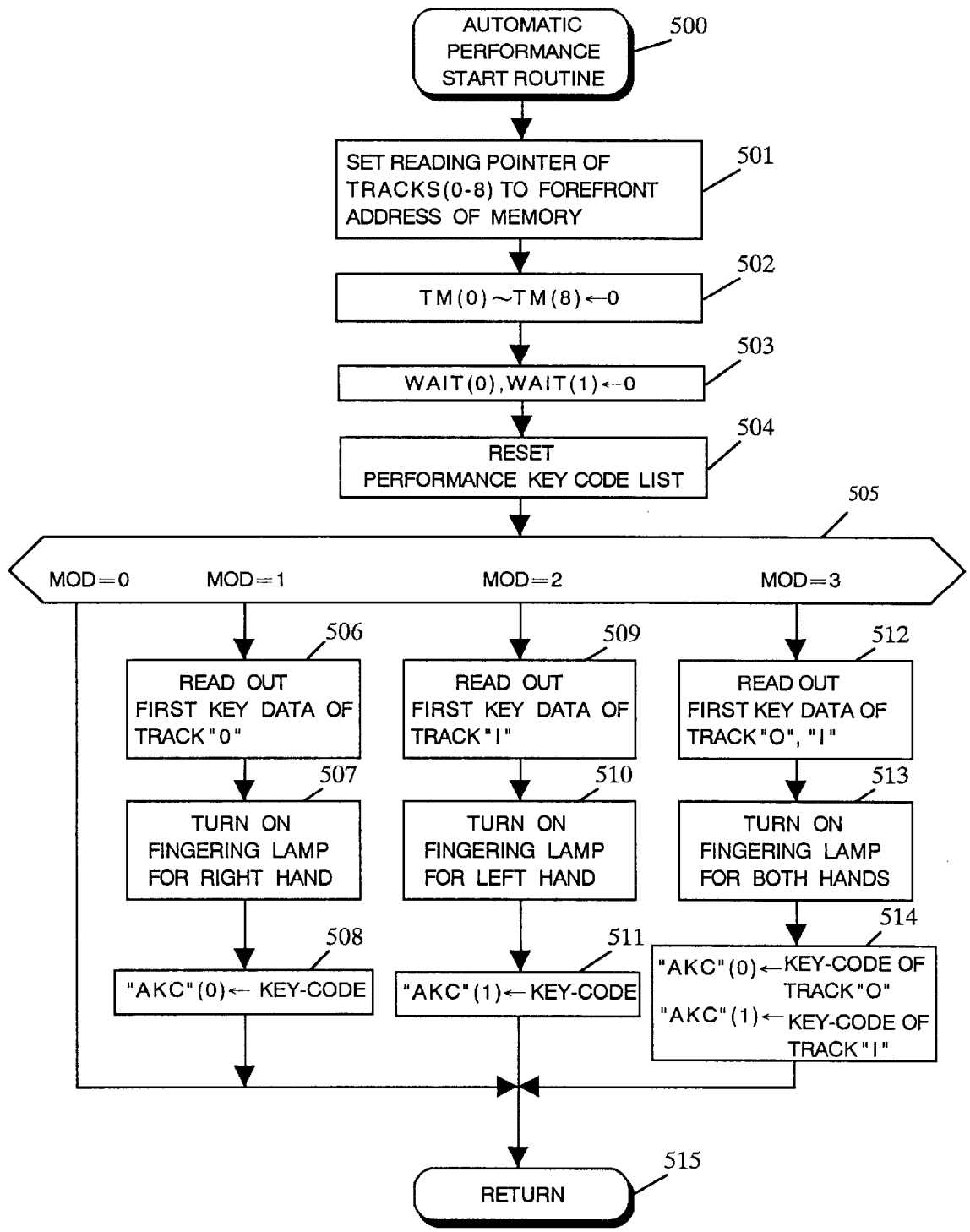

FIG.14

| | |
|---|---|
| 1 1 1 • • • 1 | POINT |
| 2 1 1 • • • 1 | NONE |
| 3 1 1 • • • 1 | NONE |
| 4 1 1 • • • 1 | POINT |
| 5 1 1 • • • 1 | |
| 1 2 1 • • • 1 | |
| 2 2 1 • • • 1 | |
| • | |
| • | |
| • | |
| • | |
| 4 5 5 • • • 5 | |
| 5 5 5 • • • 5 | |

FIG.15

TABLE FOR RIGHT HAND / TABLE FOR LEFT HAND

| DIFFERENCE IN TONE PITCH | CURRENT FINGER NUMBER | CURRENT KEY | FOLLOWING FINGER NUMBER | | | | |
|---|---|---|---|---|---|---|---|
| | | | 1 | 2 | 3 | 4 | 5 |
| 0 | 1 | any | 3 | 5 | 4 | NONE | NONE |
| | 2 | any | 4 | 3 | 5 | NONE | NONE |
| | 3 | any | 4 | 5 | 2 | 3 | NONE |
| | 4 | any | NONE | NONE | 5 | 4 | NONE |
| | 5 | any | NONE | NONE | NONE | NONE | 5 |
| ⋮ | ⋮ | ⋮ | ⋮ | | | | |
| 1 | 1 | WHITE KEY | NONE | 3 | 5 | 4 | NONE |
| | | C#, F# | 4 | NONE | 5 | NONE | NONE |
| | | Other | NONE | 4 | 5 | NONE | NONE |
| | 2 | any | 5 | NONE | NONE | NONE | NONE |
| | 3 | any | 4 | 5 | NONE | NONE | NONE |
| | 4 | C, F | NONE | 4 | 5 | NONE | NONE |
| | | Other | 4 | 3 | 5 | NONE | NONE |
| | 5 | C, F | NONE | 3 | 4 | 5 | NONE |
| | | Other | 4 | NONE | NONE | 5 | NONE |
| ⋮ | ⋮ | ⋮ | ⋮ | | | | |
| | 1 | any | NONE | 4 | 3 | 2 | 5 |
| | 2 | any | 0 | NONE | NONE | NONE | 5 |
| | 3 | any | 0 | NONE | NONE | NONE | 5 |
| | 4 | any | 0 | NONE | NONE | NONE | 5 |
| | 5 | any | NONE | NONE | NONE | NONE | NONE |

FINGERING INFORMATION ANALYZER AND ELECTRONIC MUSICAL INSTRUMENT WITH THE SAME

BACKGROUND OF THE INVENTION

1. Field of the Invention

The present invention relates to a fingering information analyzer for automatically analyzing tone pitch information indicative of each tone pitch of a series of musical notes and for producing fingering information representing a performance finger for each of musical notes. The present invention is also concerned with an electronic musical instrument provided with the fingering information analyzer in which the fingering information is adapted to indicate a performance finger for performing each of the musical notes.

2. Description of the Prior Art

As disclosed in Japanese Patent Publication 60-46432 and Utility Model Publication 63-36346, a conventional apparatus of this kind is designed to preliminarily memorize fingering information indicative of a performance finger for each musical note mixed with musical note information indicative of each tone pitch and length of a series of musical notes and to read out the memorized tone pitch and fingering information in accordance with progression of a musical tune for designating a key to be depressed and a finger for depression of the key on a basis of the read out tone pitch and fingering information.

In the conventional apparatus described above, it is, however, required to preliminarily memorize the fingering information mixed with the musical note information. For this reason, usual automatic performance information composed of the musical note information may not be utilized for fingering practice of an electronic musical instrument.

SUMMARY OF THE INVENTION

It is, therefore, a primary object of the present invention to provide a fingering information analyzer capable of utilizing the automatic performance information for fingering practice of an electronic musical instrument.

Another object of the present invention is to provide an electronic musical instrument wherein the fingering information analyzer is adapted to make fingering practice of the musical instrument possible by supply of the automatic performance information from an external record memory such as a flexible disc.

According to the present invention, the objects are accomplished by providing a fingering information analyzer wherein tone pitch information indicative of each tone pitch of a series of musical notes is automatically analyzed to produce finger information indicative of a performance finger for each of the musical notes. When the fingering information is reproduced, the performance finger for each of the musical tones is determined in accordance with a changing direction or variation width of the tone pitch information continual in time series. In addition, a changing condition of white and black keys on a keyboard is analyzed on a basis of the tone pitch information continual in time series to determine the performance finger for each of the musical tones, and the performance finger is visually indicated on a basis of the produced fingering information.

The fingering information analyzer is further characterized in that the tone pitch information is automatically analyzed to produce position information indicative of a position where a player's hand is placed for performance of the musical notes and that the position where the player's hand is placed is visually indicated. The fingering information analyzer can be adapted to an electronic musical instrument wherein the tone pitch information and fingering information are read out in accordance with progression of a musical tune to indicate a performance operation element to be operated by the player and a performance finger for operation of the operation element. In the electronic musical instrument, the reading of the tone pitch information and fingering information is stopped when the player does not operate the indicated performance operation element. In the electronic musical instrument, the tone pitch information is automatically analyzed to produce position information indicative of a position where the player's hand is placed for performance of the musical tones, and the position where the player's hand is placed is visually indicated.

BRIEF DESCRIPTION OF THE DRAWINGS

Additional objects, features and advantages of the present invention will be more readily appreciated from the following detailed description of certain preferred embodiments thereof when taken together with the accompanying drawings, in which:

FIG. 4(A) is a data format of performance information stored in a performance information memory shown in FIG. 1;

FIG. 4(B) is a data format of performance information stored in a character memory shown in FIG. 1;

FIG. 4(C) is a data format of performance information stored in a fingering memory shown in FIG. 1;

FIG. 10 is a flow chart of an automatic performance start routine shown in FIG. 5;

FIG. 14 is a data format of a fingering number combination table stored in the working memory of the modification;

FIG. 15 is a data format of tables for right and left hands memorized in the program memory of the modification shown in FIG. 13;

DESCRIPTION OF THE PREFERRED EMBODIMENTS

Figure 1:
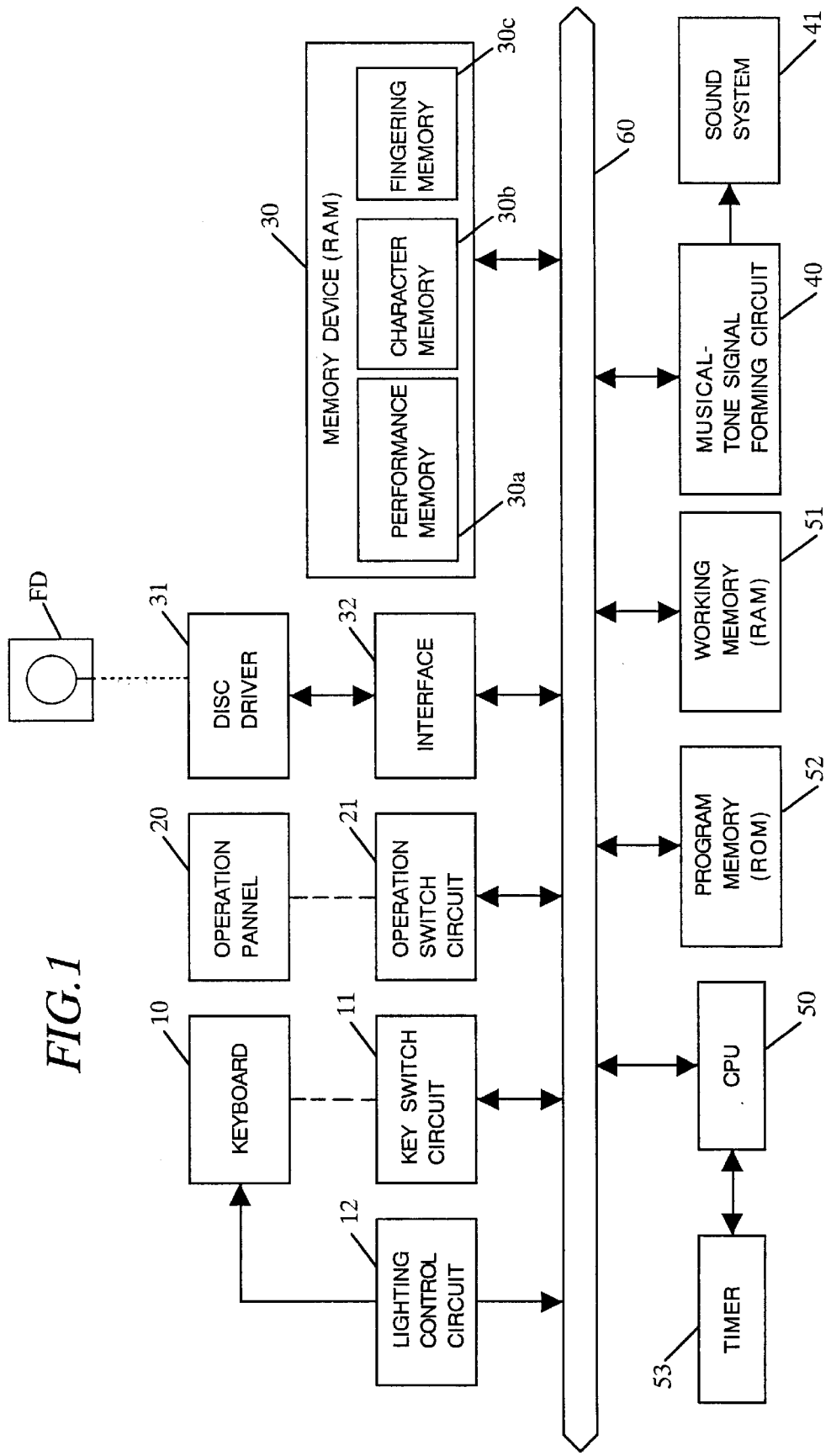
FIG. 1 is a block diagram of an electronic musical instrument provided with a fingering information analyzer according to the present invention.

In FIG. 1 of the drawings, there is schematically illustrated a block diagram of an electronic musical instrument provided with a fingering information analyzer in accordance with the present invention. The electronic musical instrument includes a keyboard device 10, an operation panel 20, a memory device 30, a musical tone signal forming circuit 40 and a central processing unit or CPU 50 of a microcomputer.

Figures 2, 3A, 3B:
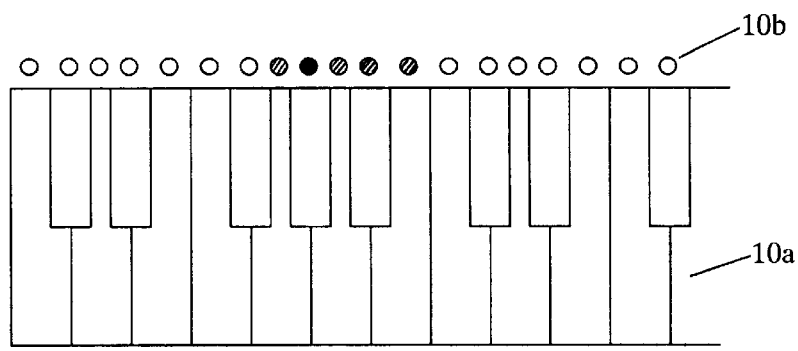
FIG. 2 is a plan view of a keyboard shown in FIG. 1.
FIG. 3(A) is a data format of a first fingering table stored in a program memory shown in FIG. 1.
FIG. 3(B) is a data format of a second fingering table stored in the program memory.

As shown in FIG. 2, the keyboard device 10 has a plurality of keys 10a composed of white keys and black keys arranged in a predetermined order as performance operation elements and a plurality of luminous elements 10b located above the keys 10a and positioned to correspond with the keys 10a for visually indicating a key to be depressed and a performance finger for depression of the key. Depression and release of the respective keys 10a are detected by a plurality of key switches provided in a key switch circuit 11 to correspond with the respective keys 10a. The luminous elements 10b each are composed of elements capable of emitting lights of different two colors, for example red and blue, under control of a lighting control circuit 12. The key switch circuit 11 and lighting control circuit 12 are connected to a bus line 60.

The operation panel 20 is provided with a plurality of operation elements for designating various operating situations of the electronic musical instrument. Operation of the respective operation elements is detected by an operation element switch provided in an operation element switch circuit 21 to correspond with the respective operation elements. The operation element switch circuit 21 is connected to the bus line 60. The memory device 30 is in the form of a random access memory or RAM which includes a performance information memory 30a, a character memory 30b and a fingering memory 30c connected to the bus line 60. These memories are arranged to memorize performance information in the form of data formats as shown in FIGS. 4(A), 4(B), 4(C). The performance memory 30a is supplied with the performance information from an external memory medium in the form of a flexible disc FD through a disc drive 31, an interface 32 and the bus line 60.

The musical tone signal forming circuit 40 is in the form of a plurality of musical tone signal forming channels which are arranged to produce a musical tone signal in accordance with control data such as a key-code, a key-on signal, a key-off signal, a tone color control data and the like applied thereto through the bus line 60. The musical tone signal forming circuit 40 is connected to a conventional sound system 41 composed of an amplifier and a speaker.

The CPU 50 is arranged to cooperate with a working memory 51 for execution of programs shown by flow charts in FIGS. 5 to 12 for control of the electronic musical instrument. The working memory 51 is in the form of a random access memory or RAM connected to the bus line 60, and the programs are memorized in a program memory 52 in the form of a read-only memory or ROM connected to the bus line 60. The CPU 50 is connected to a timer 53 which produces an interruption signal at each lapse of a predetermine time (for instance, a time corresponding with 96th note). In response to the interruption signal from timer 53, the CPU 50 executes interruption programs of FIGS. 11 and 12 memorized in the program memory 52. Memorized in the program memory 52 are first and second fingering tables TBLA and LBLB for determining a combination of finger numbers as shown in FIG. 3.

Hereinafter, operation of the electric musical instrument will be described in detail with reference to the programs shown in FIGS. 5 to 12. Assuming that a power source switch (not shown) has been closed, the CPU 50 starts to execute the main program at step 100 shown in FIG. 5 and initializes various kinds of variables at step 101 to repetitively execute processing at step 102 to 116. At step 116, the CPU 50 produces control signals for a tone color, a tone volume, a musical effect, etc. in response to operation of the operation panel 20 and applies the control signals to the musical tone signal forming circuit 40. When applied with the control signals, the musical tone signal forming circuit 40 produces a musical tone signal whose tone color, tone volume, musical effect, etc. are controlled by the control signal data. Thus, the electronic musical instrument will be operated in various conditions as described below.

a) Keyboard performance

Figure 6:
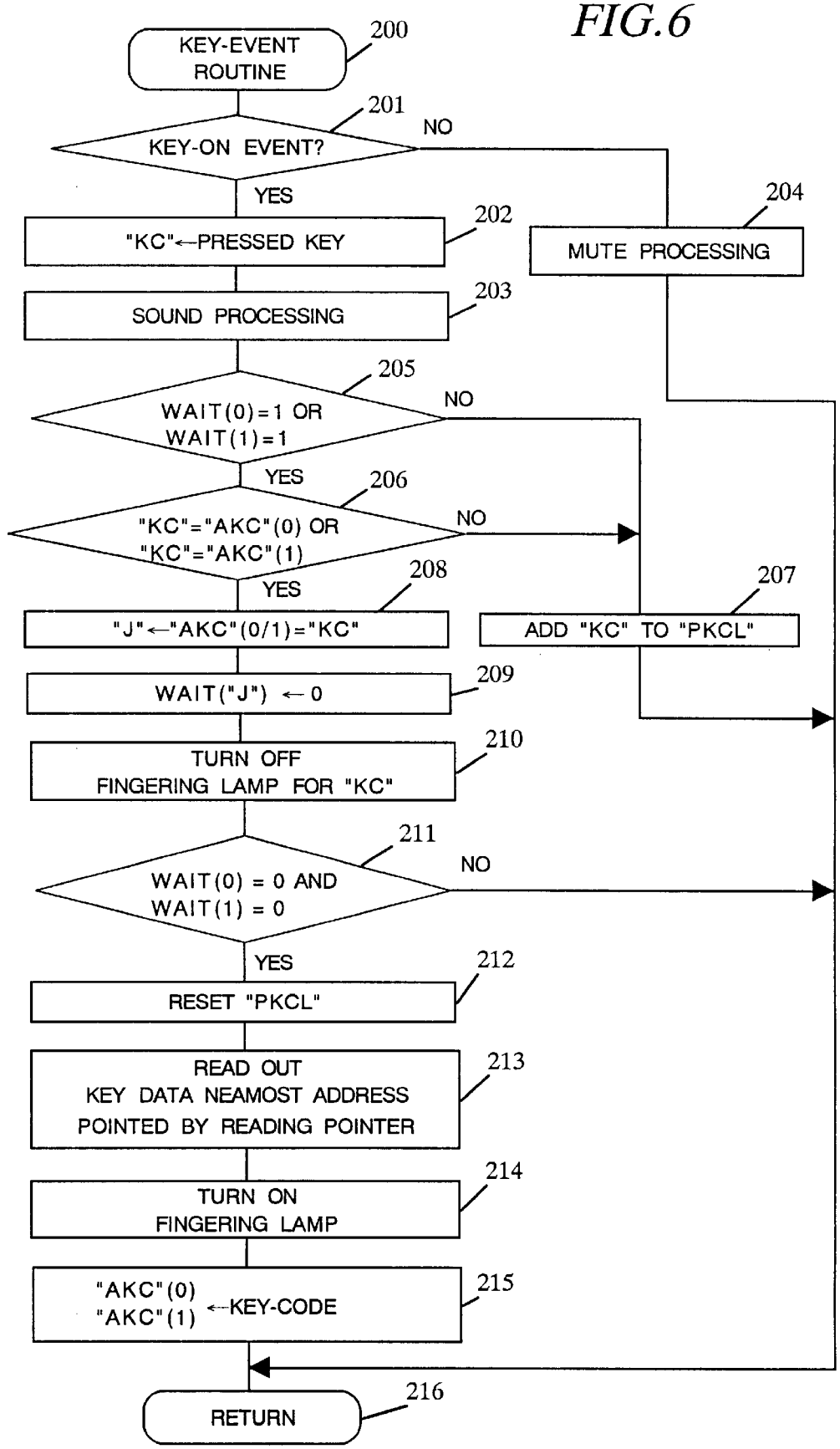
FIG. 6 is a flow chart of a key-event routine shown in FIG. 5.

When the keys 10a on the keyboard 10 are depressed or released by a player, the CPU 50 determines a "Yes" answer at step 102 and causes the program to proceed to step 103 for execution of a key-event routine shown in FIG. 6. At step 200 of FIG. 6, the CPU 50 starts to execute the key-event routine and determines at step 201 whether the key-event is a key-on event or not. If the answer at step 201 is "Yes", the CPU 50 sets at step 202 a key-code indicative of the depressed key as a key-code data KC and executes a sound processing at step 203. During execution of the sound processing, the CPU 50 applies the key-on signal with the key-code data to the musical tone signal forming circuit 40. Thus, the musical tone signal forming circuit 40 produces a musical tone signal of tone pitch defined by the key-code data KC at its available channel and applies the musical tone signal to the sound system 41. If the answer at step 201 is "No", the CPU 50 executes a mute processing at step 204. During execution of the mute processing, the CPU 50 applies a key-code data KC indicative of a released key and a key-off signal indicative of the released key to the musical tone signal forming circuit 40. When applied with the key-code data KC and key-off signal, the musical tone signal forming circuit 40 searches a musical tone signal forming channel where a musical tone signal defined by the key-code data is being produced and ceases generation of the musical tone signal after attenuated it. Thus, a musical tone corresponding with depressed and released keys on the keyboard is generated from the sound system.

b) Transfer of performance information

To transfer performance information, a flexible disc memorized with performance information is inserted into the disc driver 31 by the player. In this embodiment, performance information of a musical tune is subdivided into a plurality of parts (for instance, nine parts), and the subdivided performance information of the respective parts is memorized in a plurality of tracks (nine memory regions composed of 0 to 8 tracks) of various kinds of memory means. As shown by a data format in FIG. 4(A), the performance information of the respective parts is composed of a plurality of key-event data indicative of musical notes appearing in time series, a plurality of duration-event data indicative of intervals among the musical notes, a phrase-code indicative of each pause of phrases of the musical tune and an end-code indicative of the end of the musical tune. The key-event data is composed of a key-event code indicative of the fact that the following data is concerned with a musical note, a key-code or tone pitch information indicative of tone pitch of the musical note and a gate time indicative of a key-on time of the musical note. The duration-event data is composed of a duration code indicative of the fact that the following data is concerned with intervals among the musical notes and a duration time or tone length information indicative of intervals among the musical notes. These key-event data and duration-event data compose each musical note information indicative of a series of musical notes.

Figure 5:
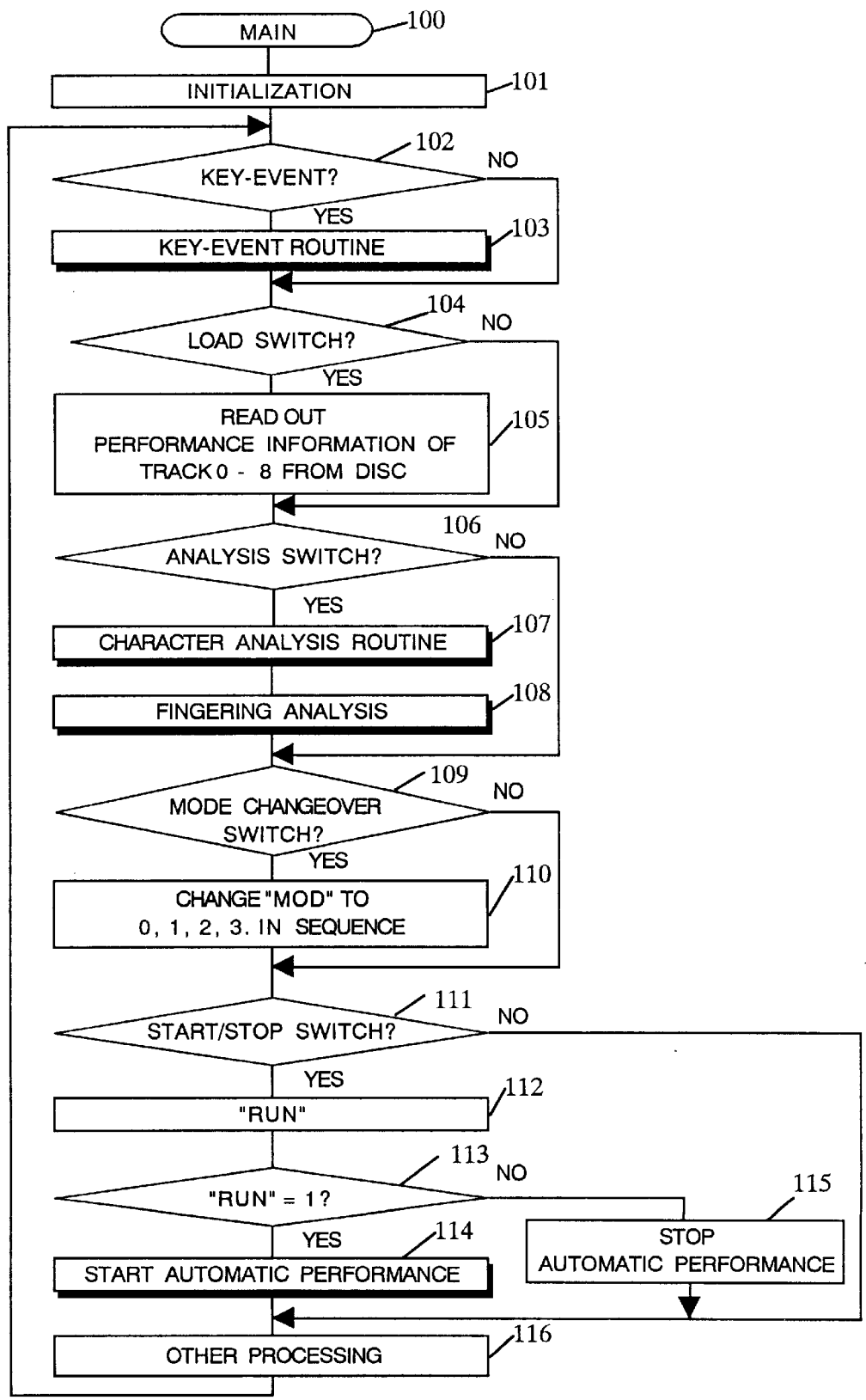
FIG. 5 is a flow chart of a main program memorized in the program memory shown in FIG. 1.

After the flexible disc has been set, the player operates a load switch provided on the operation panel 20. Thus, the CPU 50 determines a "Yes" answer at step 104 of FIG. 5 and reads out at step 105 performance information of the nine parts from the tracks 0 to 8 of the flexible disc FD to write the read out performance information into the tracks 0 to 8 of the performance information memory 30a through the interface 32.

c) Fingering analysis and application of fingering data:

When an analysis switch on the operation panel 20 is operated by the player after the performance information of the nine parts has been memorized in the performance information memory 30a, the CPU 50 determines a "Yes" answer at step 106 of FIG. 5 and causes the program to a character analysis routine at step 107 and a fingering analysis routine at step 108.

c1) Character Analysis

Figure 7A:
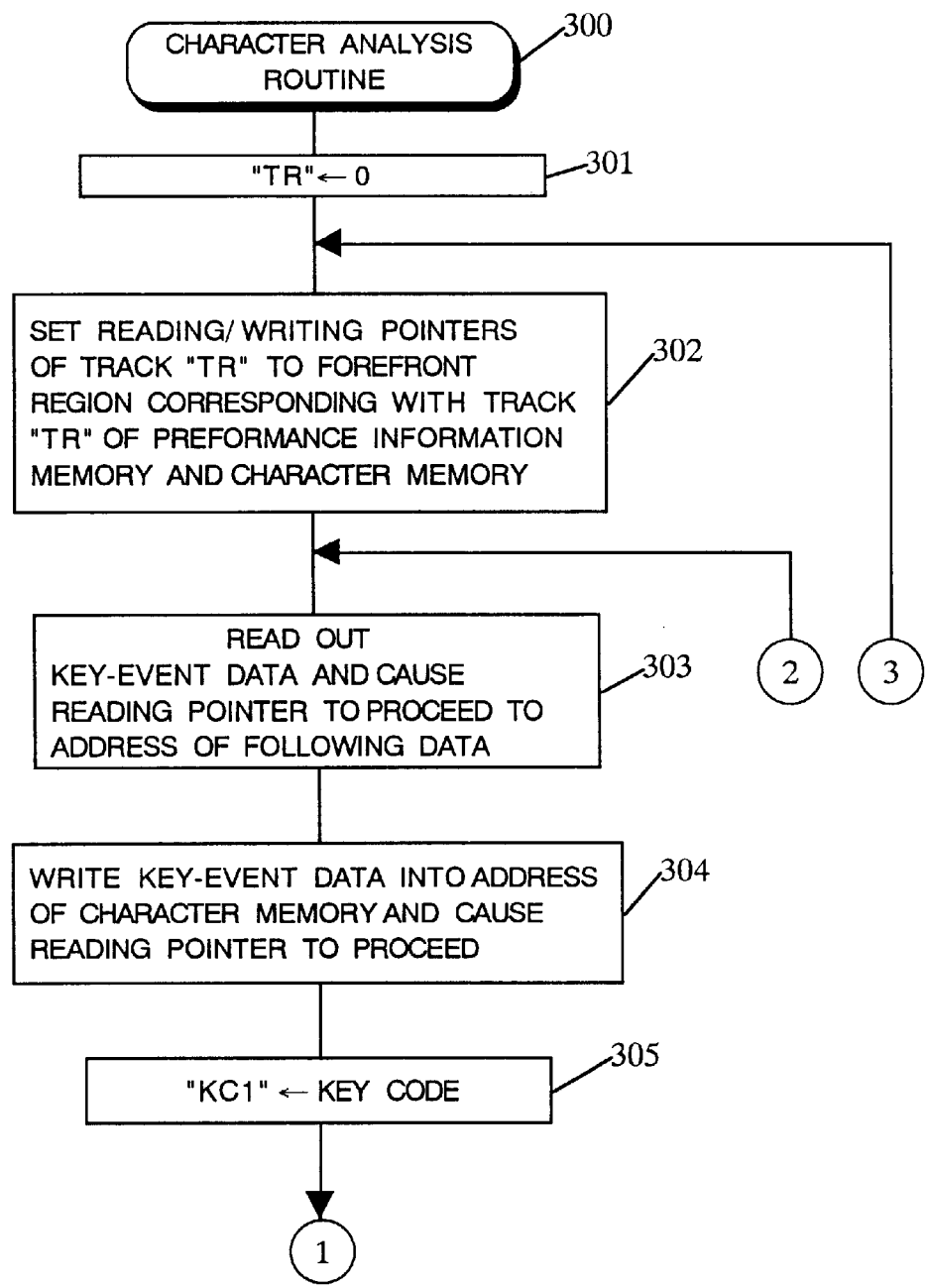
FIGS. 7(A) and 7(B) illustrate a character analysis routine shown in FIG. 5.
Figure 7B:
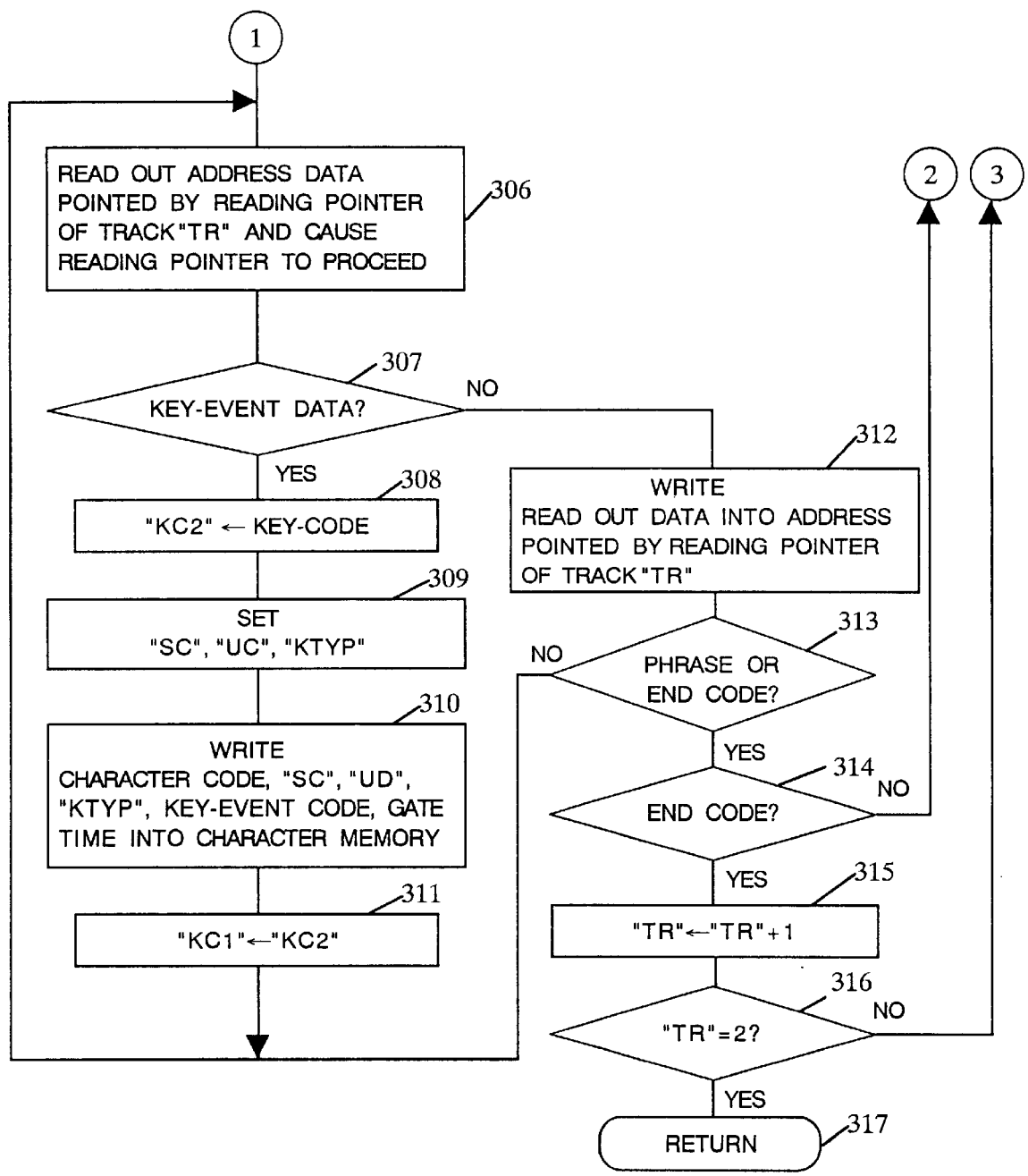

In the character analysis routine shown in FIG. 7, the CPU 50 starts at step 300 to execute the character analysis routine and sets at step 301 a track number TR as "0". At the following step 302, the CPU 50 reads out the track number TR(=0) and sets a writing pointer to each forefront address of the tracks 0 to 8 of the performance information memory 30a and the character memory 30b. Subsequently, the CPU 50 reads out key-event data (a key-event code, a key-code and a gate time) nearest to an address pointed by a reading pointer of the track number TR(=0) and causes the pointer to proceed to an address of the following data (see FIG. 4(A)) With such processing, the reading pointer is set to a forefront address of the duration-event data.

At step 304, the CPU 50 writes the read out key-event data into an address of the character memory 30b pointed by the reading pointer of the track number TR(=0) and causes the pointer to proceed to the following hollow area. (see FIG. 4(B)) Subsequently, the CPU 50 temporarily memorizes at step 305 the written key-code as an old key-code data KC1 and reads out at step 306 in FIG. 7(B) duration-event data (a duration code and a duration time) pointed by the reading pointer of the track number TR (=0). In this instance, the CPU 50 causes the pointer to proceed to an address of the following data. (see FIG. 4(A)) Thus, the CPU 50 determines at step 307 whether the read out data is a key-event data or not. Since the read out data is the duration-event data, the CPU 50 determines at step 307 a "No" answer and causes the program to proceed to step 312. At step 312, the CPU 50 writes the read out duration-event data (the duration-code and duration time) into an address of the character memory 30b pointed by the reading pointer of the track number TR (=0) and causes the pointer to proceed to the following hollow area. (see FIG. 4(B))

After processing at step 312, the CPU 50 determines at step 313 whether or not the written data is a phrase-code or an end-code. If the written data is not the phrase-code or the end-code, the CPU 50 determines a "No" answer at step 313 and returns the program to step 306. At step 306, the CPU 50 reads out data of an address pointed by the reading pointer of the track number TR (=0) and causes the pointer to proceed to an address of the following data in the same manner as described above. Subsequently, the CPU 50 determines at step 307 whether the read out data is a key-event data or not. If the answer at step 307 is "Yes", the CPU 50 temporarily memorizes at step 308 the read out key-code as a new key-code data KC2 and causes the program to proceed to step 309.

At step 309, the CPU 50 determines a scale data SC, an up-down data UD and a key-type data KTYP on a basis of the new and old key-code data KC2 and KC1 as follows:

1) If an absolute value of KC2–KC1 is smaller than or equal to "2", the scale data SC is set as "0". If the absolute value of KC2–KC1 is larger than or equal to "3" and smaller than or equal to 11, the scale data SC is set as "1". If absolute value of KC2–KC1 is larger than or equal to "12", the scale data SC is set as "0".

2) If the new key-code data KC2 is larger than or equal to the old key-code data KC1, the up-down data UD is set as "0". If the new key-code data KC2 is smaller than the old key-code data KC1, the up-down data UD is set as "1".

3) If the old and new key-code data KC1 and KC2 each represent a white key, the key-type data KTYP is set as "0". If the old and new key-code data KC1 and KC2 represent a white key and a black key respectively, the key-type data KTYP is set as "1". If the old and new key-code data KC1 and KC2 represent a black key and a white key respectively, the key-type data KTYP is set as "2". If the old and new key-code data KC1 and KC2 each represent a black key, the key-type data KTYP is set as "3".

After processing at step 309, the CPU 50 writes at step 310 a character-code into an address of the character memory 30b pointed by the reading pointer of the track number TR (=0). The character-code represents the fact that the following data is a character data and the previously set scale data SC, up-down data UD and key-type data KTYP. The CPU 50 further writes the key-event data (the key-event code, the key-code and the gate time) read out by processing at step 306 into the address of the character memory 30b. (see FIG. 4(B)) At the following step 311, the CPU 50 renews the old key-code KC1 to the new key-code KC1 and returns the program to step 306. With such processing at step 306 to 313, a series of the key-event data and duration-event data memorized in performance information memory 30a are converted into a series of data with the character data inserted therein before the key-event data and memorized again in the character memory 30b.

When the memorized data in the character memory 30b becomes a phrase-code at step 312 during repetitive processing at step 306 to 313, the CPU 50 determines a "Yes" answer at step 313 and a "No" answer at step 314 and returns the program to step 303. In this instance, the key-event data read out from the performance information memory 30a by processing at step 303, 304 is written into the character memory 30b as it is. Thus, the character data may not be written before the key-event data of the phrase. Subsequently, the CPU 50 executes processing at step 306–313 to write a key-event data, a duration-event data, a character data and a phrase-code of the following phrase into the character memory 30b.

When a final phrase data has been written in such a manner as described, the CPU 50 writes at step 312 an end-code into the character memory 30b. In this instance, the CPU 50 determines a "Yes" answer respectively at step 313 and 314 and causes the program to proceed to step 315. At step 315, the CPU 50 adds "1" to the track number TR and causes the program to proceed to step 316 where the CPU 50 determines a "No" answer and returns the program to step 302 for the processing at step 302 to 314. Thus, a character data is applied to the performance information of the track 1 in the performance information memory 30a in the same manner as described above and memorized again in the character memory 30b. When the memorization has finished, the CPU 50 changes the track number TR to "2" at step 315 and determines a "Yes" answer at step 316. After the data of the tracks 0 and 1 have been written into the character memory 30b, the CPU 50 finishes execution of the character analysis routine at step 317. In such processing as described above, the performance information of the track "0" is in the form of performance information of a part to be performed by the right hand of the player, while the performance information of the track "1" is in the form of performance information of a part to be performed by the left hand of the player.

c2) Fingering Analysis

Figure 8A:
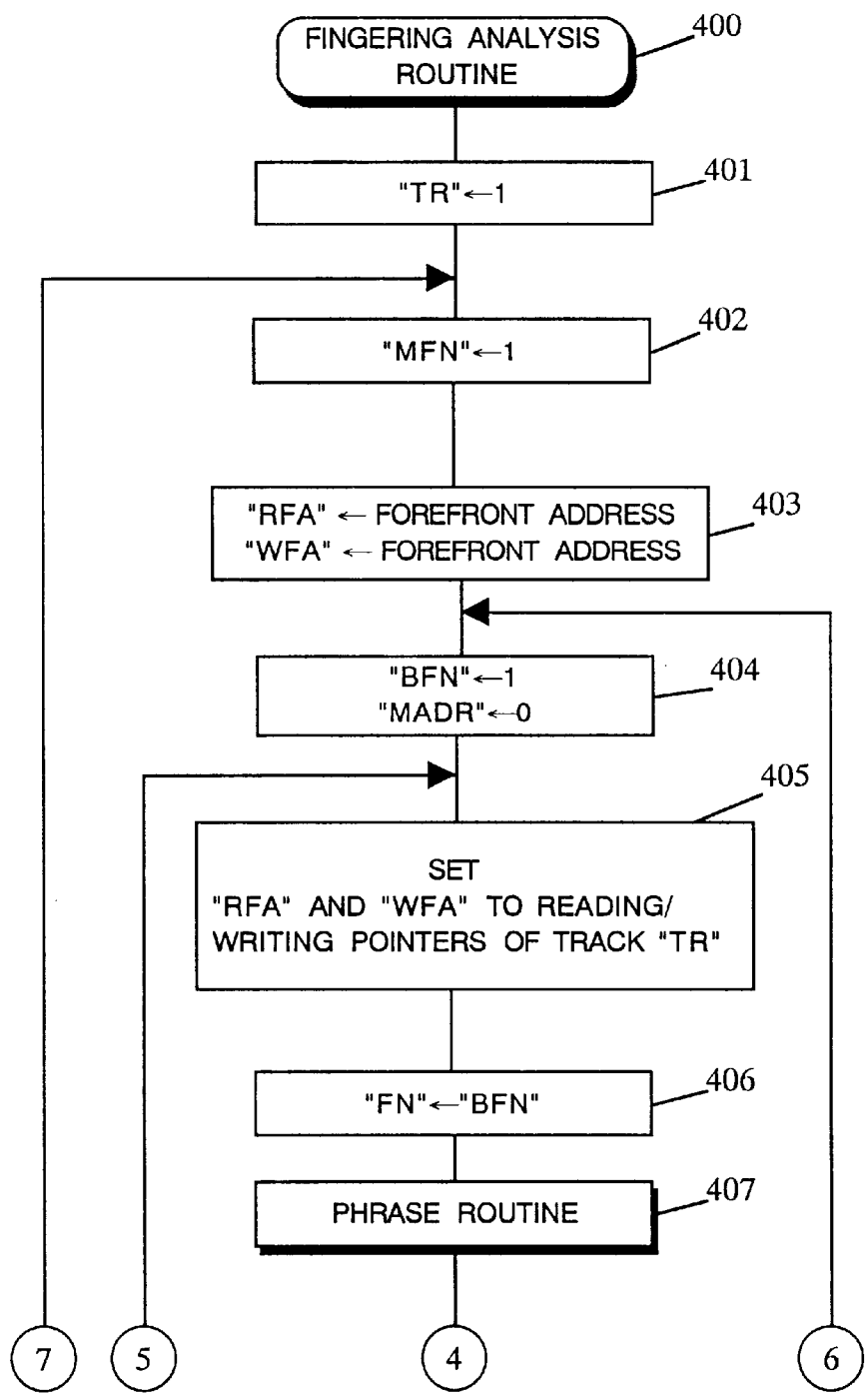
FIGS. 8(A) and 8(B) illustrate a fingering analysis routine shown in FIG. 5.

In the fingering analysis routine shown in FIG. 8, the CPU 50 starts at step 400 to execute the fingering analysis routine and sets the track number TR as "1" at step 401. At the following step 402, the CPU 50 initially sets "1" as an optimal finger number MFN for determining an optimal finger to be first used for the phrase. The finger number is determined in such a manner that each thumb of both hands is represented by "1" and that the forefinger, the middle finger, the third finger and the little finger are respectively represented by "2" to "5" in sequence. The finger number is adapted as finger information indicative of a performance finger for the performance information. When the program proceeds to step 403, the CPU 50 sets each forefront address of the tracks TR (=0) in the character memory 30b and fingering memory 30c as forefront address values RFA and WFA of the phrase and causes the program to proceed to step 404. At step 404, the CPU 50 initially sets "1" as a provisional finger number BFN temporarily indicative of the first finger for the phrase and sets "0" temporarily as a maximum address value MADR indicative of a maximum value of an address corresponding with a first note performed by first crossed fingers.

Figure 9A:
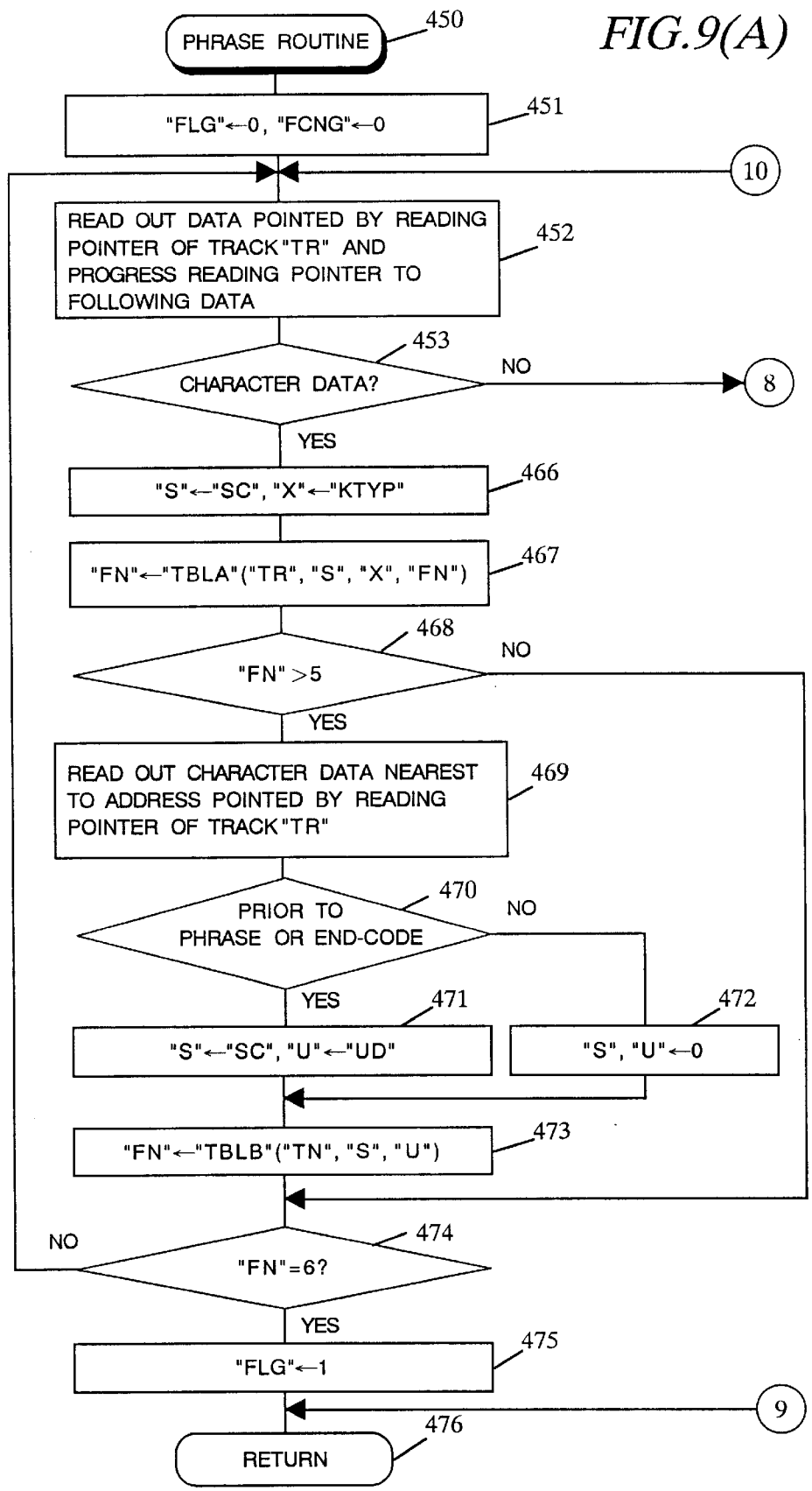
FIGS. 9(A) and 9(B) illustrate a phrase routine shown in FIG. 8(A)
Figure 9B:
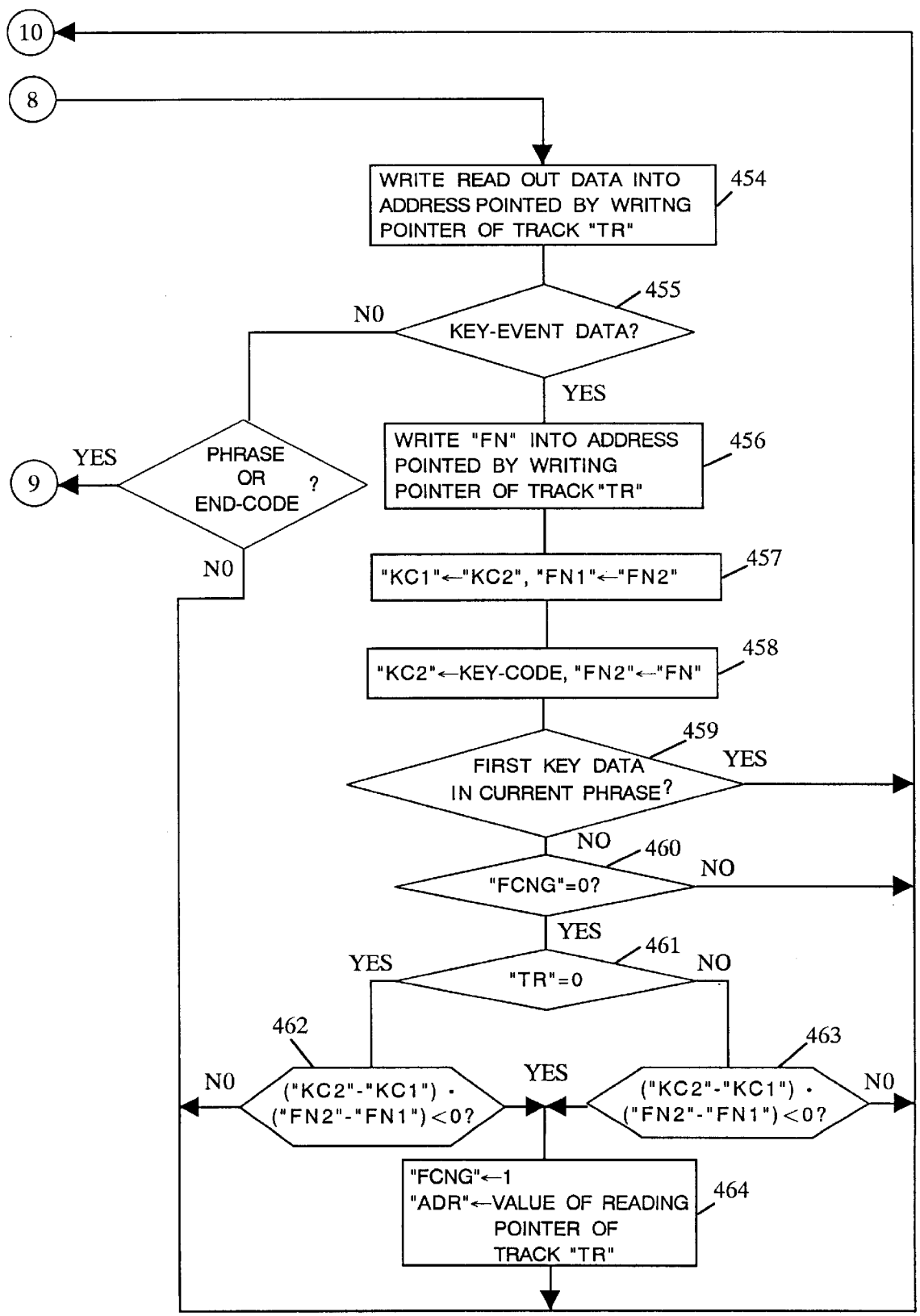

After processing at step 404, the CPU 50 sets at step 405 the reading pointer of the character memory 30b and the writing pointer of the fingering memory 30c to the forefront address values RFA and WFA of the phrase, sets at step 406 the finger number FN to the provisional finger number BFN, and causes the program to proceed to step 407 for execution of a phrase routine shown in FIGS. 9(A) and 9(B).

In the phrase routine, the CPU 50 starts at step 450 to execute the phrase routine, sets at step 451 an impossible flag FLG indicative of impossibility of fingering and a crossing flag FCNG indicative of finger crossing as "0", respectively and causes the program to proceed to step 452. At step 452, the CPU 50 reads out the memorized data from the character memory 30b at an address pointed by the reading pointer of the track number TR (=0) and causes the reading pointer to proceed to an address of the following data. (see FIG. 4(B)) In this instance, the key-event data, the duration-event data, the character data, the phrase-code and the end-code each are read out as a unit. At the following step 453, the CPU 50 determines whether the read out data is the character data or not. If the answer at step 453 is "No", the program proceeds to step 454 where the CPU 50 writes the read out data into an address of the fingering memory 30c pointed by the writing pointer of the track number TR (=0) and causes the writing pointer to proceed to the following hollow area. (see FIG. 4(C)) Subsequently, the CPU 50 determines at step 455 whether the written data is the key-event data or not. Since the key-event data, the duration-event data and the character data are previously memorized in the character memory 30b in sequence, the CPU 50 determines a "Yes" answer at step 455 and causes the program to proceed to step 456.

At step 456, the CPU 50 writes the finger number FN into an address of the fingering memory 30c pointed by the writing pointer of the track number TR (=0) and causes the writing pointer to proceed to the following hollow area. (see FIG. 4(C)) Thereafter, the CPU 50 changes at step 457 the old key-code KC1 and finger number FN1 to the new key-code KC2 and finger number FN2, respectively and changes at step 458 the new key-code KC2 and finger number FN2 to the written key-code and finger number FN, respectively. After processing at step 457 and 458, the CPU 50 determines at step 459 whether the written key-code corresponds with a first note of the current phrase or not. In this determination, the CPU 50 retracts the address of the character memory 30b until the forefront of the data or the phrase-code appears to determine whether the key-event data exists or not. Since in this instance the key-event data corresponds with the first note, the CPU 50 determines a "Yes" answer at step 459 and returns the program to step 452.

Since the key-event data, the duration-event data and the character data are memorized in the character memory 30b in sequence as described above, the duration-even data is read out from the character memory 30b by processing at step 452. Thus, the CPU 50 determines a "No" answer at step 453 and writes at step 454 the read out duration-event data into the fingering memory 30c. Thereafter, the CPU 50 determines a "No" answer respectively at step 455, 465 and returns the program to step 452. Since the character data is read out from the character memory 30b by the following processing step 452, the CPU 50 determines a "Yes" answer at step 453 and causes the program to proceed to step 466.

At step 466, the CPU 50 sets the scale data SC in the character data as a variable S and sets the key-type data KTYP as a variable X. Thereafter, the CPU 50 determines a new finger number FN on a basis of the track number TR, variables S, X and previous finger number FN with reference to the first fingering table TBLA stored in the program memory 52. As shown in FIG. 3(A), the first finger table TBLA is composed of a plurality of sub-tables corresponding with each combination of the track number TR and scale data SC (variable S). Memorized in the respective sub-tables is the following finger number FN which corresponds with each combination defined by the key-type KTYP (variable X) and the previous finger number FN. Provided that the finger number FN (sub-table number TN) larger than "5" in FIG. 3(A) represents the sub-table of the second fingering table TBLB which is composed of a plurality of sub-tables each corresponding with the sub-table number TN as shown in FIG. 3(B). Memorized in the respective sub-tables is the following finger number FN which corresponds with each combination defined by the up-down data UD and scale data (variable S). Provided that the second fingering table stores a finger number more than "6" which means impossibility of fingering.

Referring back to the program, if the finger number determined by processing at step 467 of FIG. 9(A) is less than "5", the CPU 50 determines a "No" answer respectively at step 468 and 474 and returns the program to step 452. When the finger number determined by processing at step 467 becomes more than "5", the CPU 50 determines a "Yes" answer at step 468 and causes the program to proceed to step 469. At step 469, the CPU 50 reads out the character data nearest to an address pointed by the reading pointer of track TR. At the following step 470, the CPU 50 determines whether or not the read out character data is present before the phrase-code or the end-code or whether or not the character data is present in the current phrase.

If the read out character data is present in the current phrase, the CPU 50 determines a "Yes" answer at step 470 and sets at step 471 the variables S, U as the scale data SC and up-down data UD in the read out character data. If the read out character data does not exist in the current phrase, the CPU 50 determines a "No" answer at step 470 and sets at step 472 the variables S, U as "0", respectively. After processing at step 471 and 472, the CPU 50 determines at step 473 a finger number FN on a basis of the finger number FN determined by processing at step 467 and the variables S, U with reference to the second fingering table TBLB. When the finger number FN determined by processing at step 467 is more than "6", the CPU 50 determines a new finger number FN taking into consideration the character data as far as the following character data exists in the current phrase. If the following character data is concerned with the following phrase, the CPU 50 determines the new finger number FN without taking into consideration the following character data.

If the new finger number FN determined by processing at step 473 is less than "5", the CPU 50 determines a "No" answer at step 474 and returns the program to step 452. Thus, the key-even data and the duration-event data in the character memory 30b are transferred to and memorized in the fingering memory 30c, and finger information indicative of a performance finger is applied to the key-event data. (see FIG. 4(C)) If the new finger number FN determined at step 473 is "6", the CPU 50 determines a "Yes" answer at step 474 and finishes the execution of the phrase routine at step 476 after set the impossible flag FLG as "1" at step 475.

When the first key-event data of the phrase written into the fingering memory 30c by processing at step 454 disappears, the CPU 50 determines a "No" answer at step 459 and causes the program to proceed to step 460. At step 460, the CPU 50 determines whether or not the finger crossing flag FCNG is maintained as "0" initially set by processing at step 451. If the finger crossing flag FCNG is maintained as "0", the CPU 50 determines a "Yes" answer at step 460 and determines at step 461 whether the track number TR is "0" or not or whether the performance information for the right hand is being processed or not. If the answer at step 461 is "Yes", the CPU 50 determines at step 462 whether the following inequation (1) is satisfied or not.

$$(KC2-KC1) \cdot (FN2-FN1) < 0 \quad (1)$$

In the inequation (1), the left term becomes positive when a changing direction of tone pitch becomes identical with a changing direction of the right hand finger. When the fingering is determined without any finger crossing, the CPU 50 determines a "No" answer at step 462 and returns the program to step 452. When the track number TR is "1" during processing of the performance information for the left hand, the CPU 50 determines a "No" answer at step 461 and determines at step 463 whether the following inequation (2) is satisfied or not.

$$(KC2-KC1) \cdot (FN2-FN1) > 0$$

In the inequation (2), the left term becomes negative when a changing direction of tone pitch becomes identical with a changing direction of the left hand finger. When the fingering is determined without any finger crossing, the CPU 50 determines a "No" answer at step 463 and returns the program to step 452. Thus, as far as the finger number FN is determined without any finger crossing, the key-event data with the finger number FN and the duration-event data are written into the fingering memory 30c in sequence while the finger crossing flag FCNG is maintained as "0".

When a finger number FN for finger crossing is newly determined, the inequation (1) and (2) are satisfied. Thus, the CPU 50 determines a "Yes" answer respectively at step 462 and 463 and causes the program to proceed to step 464. As step 464, the CPU 50 sets the finger crossing flag FCNG as "1" and sets the reading pointer of the track TR as an address value ADR. When the finger crossing flag FCNG has been set as "1", the CPU 50 determines a "No" answer at step 460 and returns the program to step 452. In the occurrence of finger crossing, the CPU 50 sets the finger crossing flag FCNG as "1" and memorizes the address value ADR as an address of the character memory 30b concerned with a first musical note of the phrase to be produced by the finger crossing.

When the key-event data and duration-event data with the finger number for the phrase have been written into the fingering memory 30c, a phrase-code is written into the fingering memory 30c by processing at step 454. Thus, the CPU 50 determines a "Yes" answer at step 465 and finishes execution of the phrase routine at step 476. When the endcode is written into the fingering memory 30c by processing at step 454, the CPU 50 determines a "Yes" answer at step 465 and finishes execution of the phrase routine at step 476.

Figure 8B:
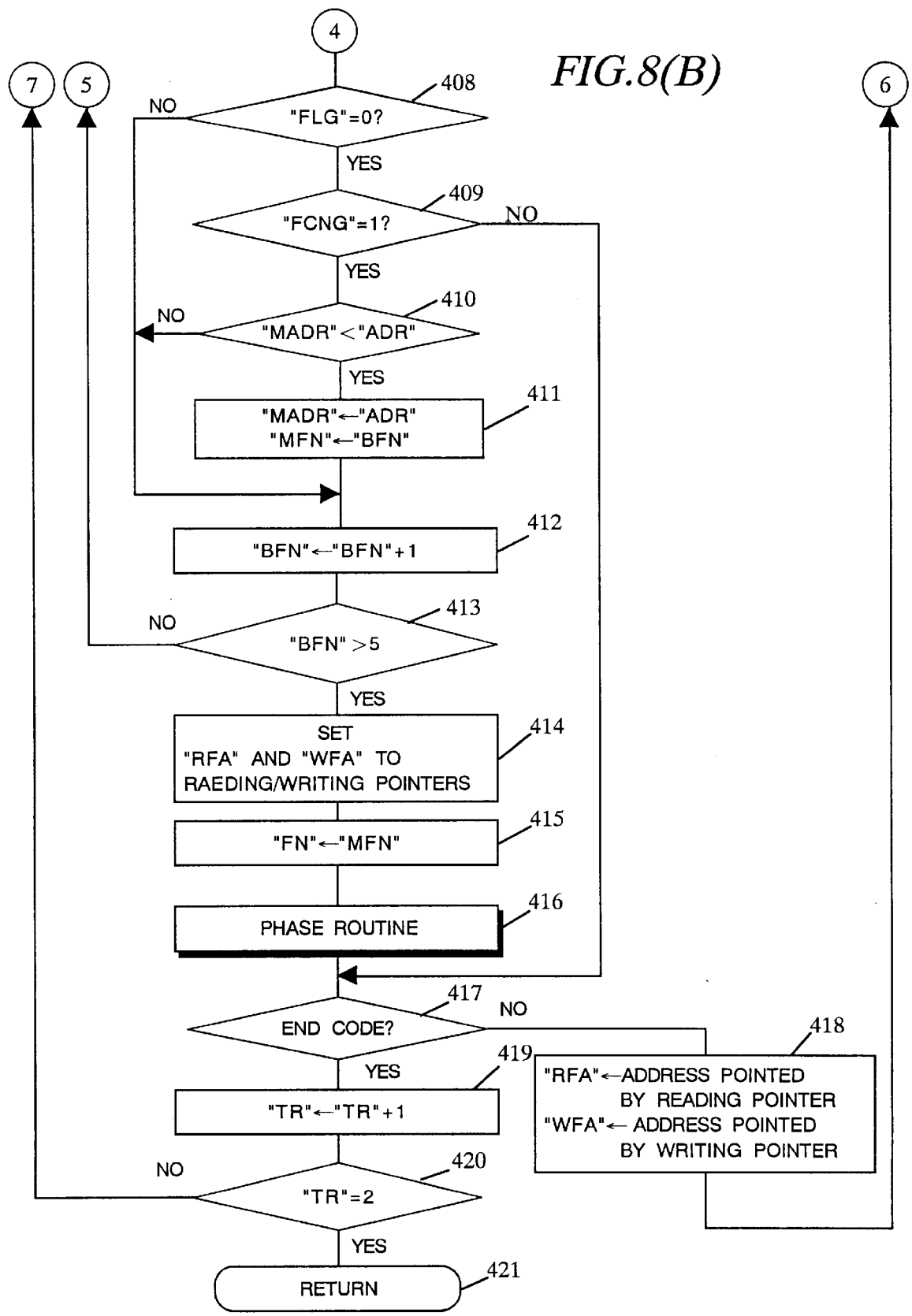

After execution of the phrase routine, the program returns to step 408 of FIG. 8(B) where the CPU 50 determines whether the impossible flag FLG is "0" or not. When the impossible flag FLG has been set as "1" by execution of the phrase routine, the CPU 50 determines a "No" answer at step 408 and causes the program to proceed to step 412. At step 412, the CPU 50 adds "1" to the provisional finger number BFN and returns the program to step 405 until the provisional finger number BFN becomes larger than "5" at step 413. Thus, the provisional finger number BFN is set as a depression finger for a first note of the phrase to determine a finger number FN for the first note of the phrase, and the data concerned with the phrase in the fingering memory 30c is rewritten.

If the impossible flag FLG is maintained as "0", the CPU 50 determines a "Yes" answer at step 408 and determines at step 409 whether the finger crossing flag FCNG is "1" or not. If the finger crossing flag FCNG is maintained as "0" after execution of the phrase routine, the CPU 50 determines a "No" answer at step 409 and causes the program to proceed to step 417. At step 417, the CPU 50 determines whether or not the end-code has been written into the track pointed by the track number TR of the fingering memory 30c. If the end-code has not yet been written in the track, the CPU 50 determines a "No" answer at step 417 and causes the program to proceed to step 418. At step 418, the CPU 50 sets forefront address values RFA, WFA of the phrase as a reading pointer value of the character memory 30b pointed by the track number TR and a writing pointer value of the fingering memory 30c, respectively, and returns the program to step 404. In this instance a series of finger numbers FN written into the fingering memory 30c by execution of the previous phrase routine are determined to initiate writing of the following phrase data.

If there is a finger crossing in the phrase applied with the finger number FN by execution of the phrase routine, the finger crossing flag FCNG is set as "1". In this instance, the CPU 50 determines a "Yes" answer at step 409 and causes the program to proceed to step 410. At step 410, the CPU 50 compares a maximum address value MADR with the address value ADR determined by execution of the phrase routine. If the address value ADR is less than the maximum address value MADR, the CPU 50 determines a "No" answer at step 410 and causes the program to proceed to step 412. If the address value ADR is larger than the maximum address value MADR, the CPU 50 determines a "Yes" answer at step 410 and changes the maximum address value MADR to the address value ADR and an optimal finger number MFN to the provisional finger number BFN set by processing at step 404 and 412. Thereafter, the CPU 50 adds "1" to the provisional finger number BFN at step 412 and repeats processing at step 405–412 until a result of the addition becomes larger than "5".

During processing at step 405 to 413, the impossible flag FLG is set as "1" with respect to all the provisional finger numbers 1–5 for the first note of the phrase. If the finger number FN for finger crossing exists in the phrase during processing at step 405 to 413, the impossible flag FLG is set as "0", and the provisional finger number BFN for last finger crossing is stored as an optimal finger number MFN. After processing at step 405–413, the CPU 50 sets at step 414 the reading pointer of the character memory 30*b* and the writing pointer of the fingering memory 30*c* respectively to the forefront address values RFA, WFA in the same manner as processing at step 405. Subsequently, the CPU 50 sets at step 415 the finger number FN to the optimal finger number MFN and executes the phrase routine of FIG. 9 at step 416.

During execution of the phrase routine, the finger number FN corresponding with the first note of the phrase is set as an optimal finger number MFN, and the key-event data including the finger number FN for the phrase, the duration-event data and the phrase-code are memorized again in the fingering memory 30*c*. Thus, a series of finger numbers FN for the phrase are determined. After processing at step 416, the following phrase data is processed in the same manner as described above, and the end-code is written into the fingering memory 30*c*. In turn, the CPU 50 determines a "Yes" answer at step 417 and causes the program to proceed to step 419. Then, the CPU 50 adds "1" to the track number TR at step 419 and determines a "No" answer at step 420 to return the program to step 402. As a result, the performance information for the left hand is applied with the finger number FN and written into the fingering memory 30*c*. (see FIG. 4(C)) When the data processing of the track 1 has finished, the CPU 50 changes the track number TR to "2" by processing at step 419 and determines a "Yes" answer at step 420 to finish execution of the fingering analysis routine at step 421.

In the analysis of the fingering information described above, performance information including musical note information memorized in the flexible disc is temporarily transferred to the performance information memory 30*a* and is automatically analyzed to apply a character data to each note information in accordance with continuous note information and to memorize performance information applied with the character data in the character memory 30*b*. Thus, a finger number (finger information) FN is determined on a basis of the character data and applied to the performance information (note information) in stead of the character data memorized in the character memory 30*b*. Thus, the performance information is memorized with the finger number in the fingering memory 30*c*. Accordingly, the flexible disc FD acts to supply the performance information (tone pitch information, note information), the performance information memory 30*a* acts a buffer memory to supply the performance information, and the character memory 30*b* acts as a buffer memory.

Although in this embodiment there have been provided the performance information memory 30*a*, the character memory 30*b* and the fingering memory 30*c*, only the performance information memory 30*a* may be provided to memorize the character data overlapped with the performance information supplied from the flexible disc FD and to memorize the fingering information based on the character data.

d) Automatic Performance

Hereinafter, automatic performance and fingering indication based on the memorized data in the performance information memory 30*a* and fingering memory 30*c* will be described with reference to FIGS. 5 and 10–12. Assuming that a mode changeover element on the operation panel 20 has been operated by the player, the CPU 50 determines a "Yes" answer at step 109 of FIG. 5 and changes a mode data MOD in sequence. In this instance, the CPU 50 changes the current mode data MOD to "1" if it is "0", to "2" if it is "1", to "3" if it is "2" and to "0" if it is "3". In the mode data MOD, the numeral "0" represents a normal reproduction mode for the performance information of the tracks 0–8, the numeral "1" represents a right hand guide mode for reproduction of the performance information of the tracks 1–8 and for utilizing the performance information of the track 0 to indicate fingering of the right hand, the numeral "2" represents a left hand guide mode for reproduction of the performance information of the tracks 0, 2–8 and for utilizing the performance information of the track 1 to indicate fingering of the left hand, and the numeral "3" represents a both hands guide mode for reproduction of the performance information of the tracks 2–8 and for utilizing the performance information of the tracks 1 and 0 to indicate fingering of the right and left hands.

When the player operates a start/stop element on the operation panel 20 after setting the mode data MOD, the CPU 50 determines a "Yes" answer at step 111 and inverts at step 112 a run flag RUN indicative of automatic performance. That is, the CPU 50 changes the current run flag RUN to "1" if it is "0" and to "1" if it is "0". When the current run flag RUN becomes "1" as a result of the inversion, the CPU 50 determines a "Yes" answer at step 113 and executes at step 114 an automatic performance start routine shown in FIG. 10. After processing at step 114, the CPU 50 executes an interruption program in response to an interruption signal from the timer 53. (see FIG. 11) During execution of the interruption program, the CPU 50 will effect automatic operation for reproduction and fingering at the respective modes by using the memorized data in the performance memory 30*b* and fingering memory 30*c*. When the run flag RUN becomes "0" as a resultant of the inversion, the CPU 50 determines a "No" answer at step 113 and stops the automatic performance at step 115.

The automatic operation of the electronic musical instrument at the respective modes will be described hereinafter.

d1: Normal reproduction mode

Assuming that the mode data MOD has been set as "0" to operate the electronic musical instrument at a normal reproduction mode, the CPU 50 starts to execute the automatic performance start routine at step 500 shown in FIG. 10 and sets the reading pointers of all the tracks 0–8 to the forefront addresses of the respective tracks in the performance information memory 30*a*. At the following step 502, the CPU 50 sets duration time count values TM(0)–TM(8) for measurement of time intervals of each note of the tracks as "0".

Subsequently, the CPU 50 sets waiting flags WAIT (0), WAIT (1) as "0" at step 503. In this embodiment, the waiting flags correspond with the tracks 1 and 0 for temporarily stopping progression of the automatic performance until a correct key is depressed in dependence upon indication of fingering. At step 504, the CPU 50 resets a performance key-code list PKCL for temporarily memorizing a key-code indicative of a depressed key on the keyboard 10. When the program proceeds to step 505, the CPU 50 determines the operation mode of the electronic musical instrument defined by the mode data MOD. Since in this instance the mode data MOD is set as "0", the CPU 50 causes the program to proceed to step 515.

Figure 11:
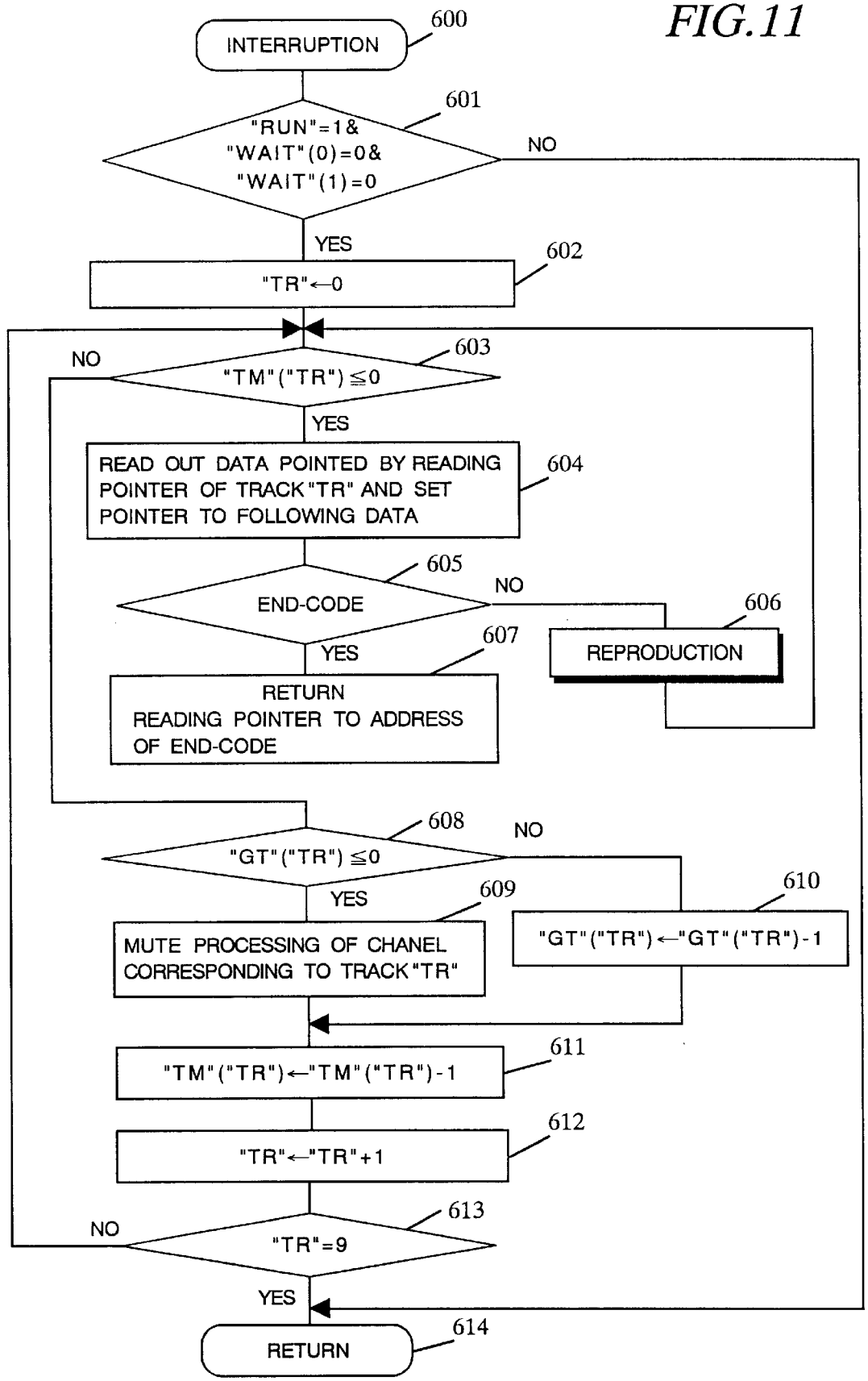
FIG. 11 is a flow chart of an interruption program memorized in the program memory shown in FIG. 1.

After execution of the automatic performance start routine, the CPU 50 starts to execute the interruption program of FIG. 11 in response to an interruption signal applied thereto from the timer 53 at step 600 of FIG. 11. When the interruption program proceeds to step 601, the CPU 50 determines whether the run flag RUN is "1" or not and determines whether both the waiting flags WAIT (0), WAIT (1) are "0" or not. Since in this instance, the run flag RUN is being set as "1" and both the waiting flags WAIT (0), WAIT (1) are being set as "0", the CPU 50 determines a "Yes" answer at step 601 and causes the program to proceed to step 603 after set the track number TR as "0" at step 602.

At step 603, the CPU 50 determines whether the duration time count value TM (TR) (=TM(0)) designated by the track number TR is less than "0" or not. Since the duration time count value TM (TR) is being set as "0" by execution of the automatic performance start routine, the CPU 50 determines a "Yes" answer at step 603 and reads out the memorized data addressed by the reading pointer of the track number TR in the automatic performance memory 30*a* at step 604. At step 604, the CPU 50 further causes the reading pointer to proceed to the following data (i.e. the memorized position of the duration-event data). As the memorized data is the key-event data, the CPU 50 determines a "No" answer at step 605 and causes the program to proceed to step 606 for execution of a reproduction routine shown in FIG. 12.

Figure 12:
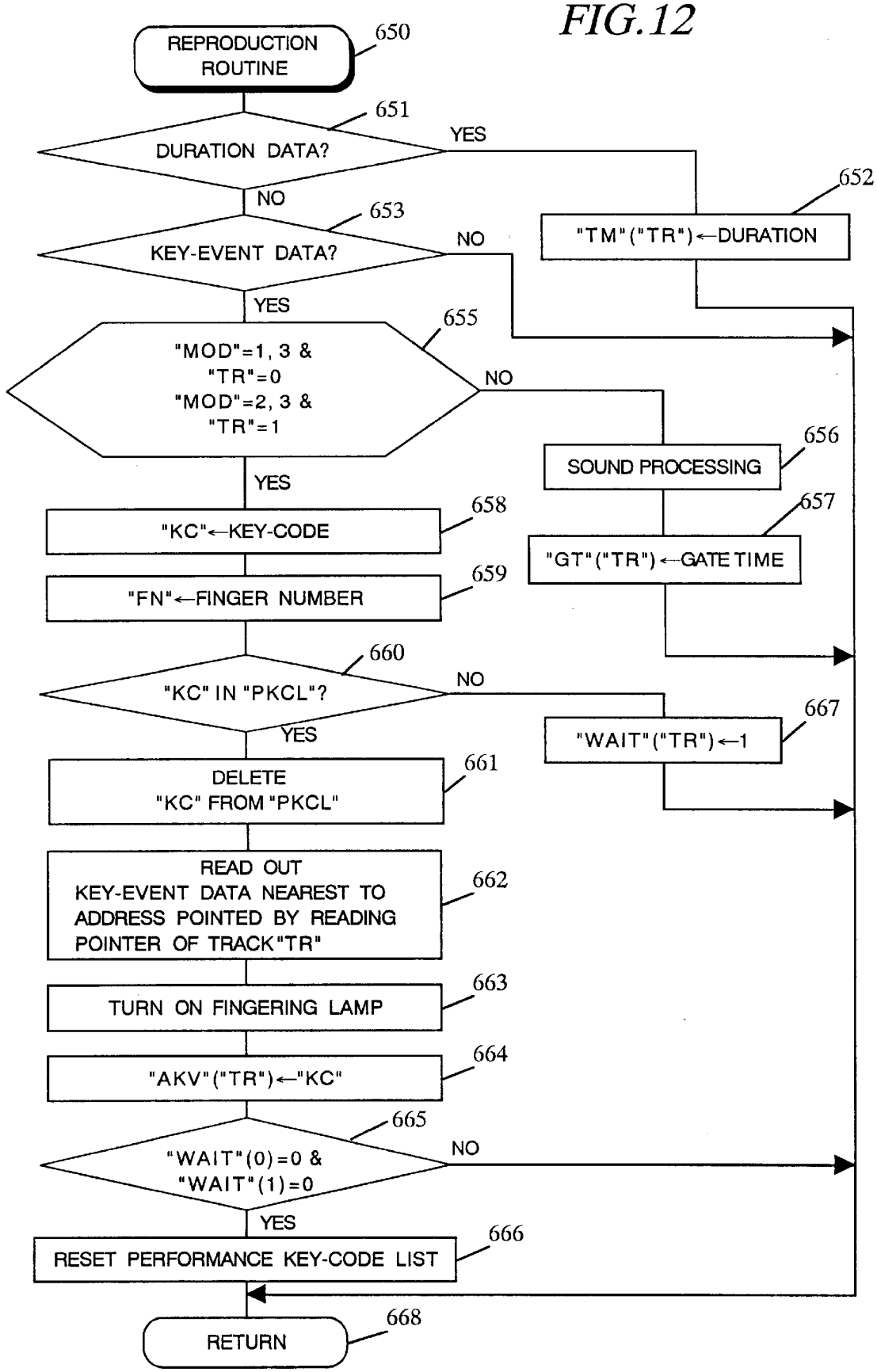
FIG. 12 is a flow chart of a reproduction routine shown in FIG. 11.

Thus, the CPU 50 starts to execute the reproduction routine at step 650 shown in FIG. 12 and determines at step 651, 653 whether or not the read out data is the duration-event data or the key-event data. In this instance, the CPU 50 determines a "Yes" answer at step 653 and causes the program to proceed to step 655. At step 655, the CPU 50 determines whether or not the mode data MOD is "1" or "3" and the track number TR is "0" or whether or not the mode data MOD is "2" or "3" and the track number TR is "1". In this instance, the mode data MOD is being set as "0", the CPU 50 determines a "No" answer at step 655 and executes sound processing at step 656. During execution of the sound processing, the CPU 50 applies a key-code and a key-on signal of the read out key-event data to the musical tone signal forming circuit 40 where a musical tone signal of tone pitch defined by the key-code is produced and applied to the sound system 41. Thus, the musical tone signal based on the performance information of the track 0 is produced. After processing at step 656, the CPU 50 sets the gate time in the read out key-event data to a gate time count value GT (TR) and finishes execution of the reproduction routine by processing at step 668.

After execution of the reproduction routine at step 606 of FIG. 11, the program returns to step 603. As the duration time count TM (TR) is being maintained as "0", the CPU 50 determines a "Yes" answer at step 603 and reads out at step 604 the memorized data addressed by the reading pointer of the track number TR in the automatic performance memory 30*a*. In this instance, the CPU 50 causes the reading pointer of the track number TR to proceed to the following data. Since the read out data is the duration-event data, the CPU 50 determines a "Yes" answer at step 651 of FIG. 12 and sets at step 652 the duration time of the duration-event data as a duration time count TM (TR). Thus, the CPU 50 finishes execution of the reproduction routine at the following step 668. When the duration time count value TM (TR) becomes larger than "0", the CPU 50 determines a "No" answer at step 603 and causes the program to proceed to step 608.

At step 608, the CPU 50 determines whether the gate time count value GT (TR) designated by the track number TR is less than "0" or not. Since the gate time count value GT (TR) is being set as a larger value than "0" by processing at step 657 of FIG. 12, the CPU 50 determines a "No" answer at step 608 and causes the program to proceed to step 610 and 611. Thus, the CPU 50 subtracts "1" from the gate time count value GT (TR) at step 610 and subtracts "1" from the duration time count value TM (TR) at step 611. Subsequently, the CPU 50 adds "1" to the track number TR at step 612 and determines at step 613 whether the track number TR added with "1" is identical with "9" or not. Until the track number TR becomes "9", the CPU 50 returns the program to step 603 where the key-event data and duration-event data of the performance information of the tracks 1–8 are read out from the performance memory 30*a* in the same manner as described above. Thus, the CPU 50 controls production of a musical tone signal on a basis of the read out data and sets the duration time count value TM (TR) and gate time count value GT (TR) to the read out duration time and gate time, respectively. When the track number TR becomes "9", the CPU 50 determines a "Yes" answer at step 613 and finishes execution of the interruption program at step 614.

When applied with an interruption signal from the timer 53, the CPU 50 restarts to execute the interruption program at step 600 of FIG. 11. In this instance, the run flag RUN is being maintained as "1", and both the waiting flags WAIT (0), WAIT (1) are being maintained as "0". Thus, the CPU 50 changes the track number TR from "0" to "8" in sequence by processing at step 602, 612, 613 and executes processing at step 603–611. While the duration time count value TM (TR) and gate time count value GT (TR) are maintained larger than "0", the CPU 50 determines a "No" answer respectively at step 603, 608 and subtracts "1" respectively from the gate time count value GT (TR) and duration time count value TM (TR) by processing at step 610 and 611. When the gate time count value GT (TR) designated by the track number TR becomes "0" as a result of the subtraction, the CPU 50 determines a "Yes" answer at step 608 and applies at step 609 a control signal to the musical tone signal forming circuit 40 for turning off the musical tone signal being produced on a basis of the data of the track TR. In turn, the musical tone signal forming circuit 40 attenuates the musical tone signal of the track TR and stops production of the musical tone signal.

When the duration time count value TM (TR) designated by the track number TR becomes "0" upon further lapse of a time, the CPU 50 determines a "Yes" answer at step 603 and causes the program to proceed to step 604. Thus, the CPU 50 reads out the key-event data and duration-event data of the following note by processing at step 603–606 to control production of the following musical tone signal. When the phrase-code is read out from the performance information memory 30*a* under control of production of the musical tone signal, the CPU 50 determines a "No" answer respectively at step 651, 653 of FIG. 12 and finishes execution of the reproduction routine at step 668. In this instance, the reading pointer designated by the track number TR is set as an address of the following key-event data by processing at step 604. Accordingly, the CPU 50 reads out the key-event data and duration-event data for a forefront note of the following phrase to control production of a musical tone signal of the forefront note.

If the read out data is an end-code, the CPU 50 determines a "Yes" answer at step 605 and returns at step 607 the reading pointer to the address where the end-code is memorized. In this instance, the CPU 50 always reads out the end-code by processing at step 603–605 of FIG. 11 and causes the program to proceed to step 612 through step 607. With such execution of the program as described above, musical tone signals of the tracks 0–8 are successively reproduced.

d2: Right hand guide mode

Assuming that the mode data MOD has been set as "1" to operate the electronic musical instrument at a right hand guide mode, the reading pointer of the track 0 is set to the forefront address of the track in the fingering memory 30c by processing at step 501–504 of the automatic performance start routine shown in FIG. 10, the reading pointer of the remaining tracks 1–8 is set to the forefront address of the respective tracks in the performance information memory 30a, the duration time count values TM(0)–TM(8) and the waiting flags WAIT (0), WAIT (1) each are set as "0", and the performance key-code list PKCL is reset. Thereafter, the processing at step 506–508 is executed in dependence upon determination at step 505.

At step 506, the CPU 50 reads out the key-code and finger number from the first key-event data of the track 0. In this instance, the reading pointer does not proceed. At step 507, the CPU 50 produces indication information for control of lighting of luminous elements 10b for the right hand on a basis of the read out key-code and finger number FN and applies the indication information to the lighting control circuit 12. Thus, the luminous elements 10b are turned on under control of the lighting control circuit 12. In this instance, as shown in FIG. 2, the luminous elements 10b corresponding with a key defined by the key-code is lighted in red, the FN–1 pieces of the left hand luminous elements 10b adjacent the luminous elements 10b lighted in red are lighted in blue, and the 5–FN pieces of the right-hand luminous elements 10b adjacent the luminous elements 10b lighted in red are lighted in blue. That is, the five luminous elements 10b corresponding with each finger of the right hand are arranged to be lighted in red for indicating a key to be depressed and a finger used for depression of the key. The lighting of the five luminous elements 10b indicates a position where the right hand is placed. At step 508, the CPU 50 sets an automatic key-code AKC(0) indicative of a key designated by the luminous element 10b lighted in red to the read out key-code.

After execution of the automatic performance start routine, the CPU 50 executes the interruption program of FIG. 11 at each time when applied with the interruption signal from the timer 53. In such execution of the interruption program, the performance information memorized in the tracks 1–8 of the performance information memory 30a is reproduced as a musical tone signal as described above to effect automatic performance based thereon. In this instance, the fingering information memorized in the track 0 of fingering memory 30c may not be reproduced as a musical tone signal. When the key-event data is read out, the mode data MOD is set as "1" and the track number TR is set as "0" at step 655 of the reproduction routine of the interruption program. Thus, the CPU 50 determines a "Yes" answer and causes the program to proceed to step 658–660. At step 658, 659, the CPU 50 sets the key-code and finger number read out from the track 0 as the key-code data KC and finger number FN. At step 660, the CPU 50 determines whether the key-code data KC is included in the performance key-code list PKCL or not.

In the meantime, the keyboard performance is played by depression of keys designated by the fingering indication. Thus, the CPU 50 executes a key-event routine shown in FIG. 6 to produce a musical tone signal in response to depression of the keys. During execution of the key-event routine, the CPU 50 executes the sound processing at step 203 and determines at step 205 whether the waiting flag WAIT(0) or WAIT(1) is "1" or not. The waiting flag WAIT (1) is always maintained as "0" at the right hand guide mode, while the waiting flag WAIT(1) is maintained as "0" if the keyboard performance is coincident with or quicker than the automatic performance. If the keyboard performance delays, the waiting flag WAIT(1) is changed to "1" by processing described later.

Assuming that the timing of key depression is coincident with or quicker than the timing of the automatic performance, the CPU 50 determines a "No" answer at step 205 and adds at step 207 the key-code indicative of the performed keys to the performance key-code list PKCL in the working memory 51. Thus, the CPU 50 determines a "Yes" answer at step 660 of FIG. 12 and causes the program to proceed to step 661–664. At step 661, the CPU 50 deletes the read out key-code from the performance key-code list PKCL. At the following step 662, the CPU 50 reads out a key-even data nearest to an address pointed by the reading pointer of the track 0. In this instance, the CPU 50 does not proceed the reading pointer of the track 0. Subsequently, the CPU 50 turns on at step 663 the luminous elements 10b based on the read out key-code and finger number FN to indicate a key to be depressed and a finger for depression of the key and sets the automatic key-code AKC(0) to the read out key-code.

After processing at step 664, the CPU 50 determines a "Yes" answer at step 665 and finishes execution of the reproduction routine at step 668 after reset the performance key code list PKCL at step 666. Thus, if the timing of key depression is coincident with or quicker than the timing of the automatic performance, the fingering indication is effected prior to one note. When an indicated key is depressed, a key-code indicative of the depressed key is written into the performance key code list PKCL. When the automatic performance is conducted at the original timing, fingering indication for the following note is effected, the performance key code list PKCL is reset, the automatic performance progresses at a predetermined speed.

When the timing of key depression is slower than the timing of the automatic performance, the key-code of the track 0 read out from the fingering memory 30c is not included in the performance key code list PKCL. Thus, the CPU 50 determines a "No" answer at step 660 of FIG. 12 and causes the program to proceed to step 667. In turn, the CPU 50 finishes execution of the reproduction routine at step 668 after set the waiting flag WAIT(0) to "1" at step 667. When the waiting flag WAIT(0) is set to "1", the CPU 50 determines a "No" answer at step 601 even if the interruption program of FIG. 11 is executed. As a result, the CPU 50 stops reading the performance information from the performance information memory 30a and fingering memory 30c and stops the automatic performance. Also, during execution of the key-event routine of FIG. 6 responsive to the key depression, the CPU 50 determines a "Yes" answer at step 205 and causes the program to proceed to step 206. At step 206, the CPU 50 compares the key-code KC indicative of the depressed key with the automatic key-code AKC(0) read out from the track 0. If both the key-codes AKC(0) and KC are not identical with each other due to incorrect depression of the key, the CPU 50 determines a "No" answer at step 206 and causes the program to proceed to step 207. Thus, the CPU 50 adds at step 207 the key-code KC of the depressed key to the performance key code list PKCL and finishes execution of the key-event routine at step 216. If the key-code KC coincides with the key-code AKC (0), the CPU 50 determines a "Yes" answer at step 206 and causes the program to proceed to step 208, 209.

At step 208, the CPU 50 sets the track number including the automatic key-code AKC(0) as a variable J. In this instance, the variable J is set as "0". At step 209, the CPU 50 changes a waiting flag WAIT(J) defined by the variable J or the waiting flag WAIT(0) to "0". Subsequently, the CPU 50 turns off at step 210 the luminous element 10b currently lighted and determines at step 211 whether both the waiting flags WAIT(0) and WAIT(1) are "0" or not. Since in this instance, the waiting flag WAIT(1) is maintained as "0" as described above while the waiting flag WAIT(0) is changed to "0" by processing at step 209, the CPU 50 determines a "Yes" answer at step 211 and causes the program to proceed to step 212–215. Thus, the CPU 50 resets the performance key code list PKCL at step 212 and reads out at step 213 a key-event data nearest to an address pointed by the reading pointer of the track TR (=0), i.e. the key-code and finger number FN in the key-event data of the following note. In this instance, the reading pointer does not progress. At step 214, the CPU 50 turns on the luminous elements 10b for the right hand on a basis of the read out key-code and finger number FN in the same manner as processing at step 507 of FIG. 10. As a result, a key to be depressed for the following note and a finger for depression of the key are indicated by the luminous element 10b lighted in red, and the other fingers are indicated by the luminous elements 10b lighted in blue. Thereafter, the CPU 50 sets at step 215 the read out key-code as the automatic key-code AKC(0) and finishes execution of the key-event routine at step 216.

When the interruption program of FIG. 11 is further executed, the CPU determines a "Yes" answer at step 601 since both the waiting flags WAIT(0) and WAIT(1) are being set as "0" and causes the program to proceed to step 602. Accordingly, if the timing of key depression is slower than the timing of the automatic performance, fingering indication will be effected prior to one note, and the automatic performance is temporarily stopped at the timing of key depression for the note. If a key indicated by the fingering indication is depressed during stopping of the automatic performance, fingering indication for the following note is effected at the timing of the key depression, and the automatic performance is restarted.

As described above, the fingering indication for the right hand at the right hand guide mode is effected before one note prior to the original timing. Accordingly, when the player depresses the keys in dependence upon the fingering indication, a musical tone signal is produced in response to depression of the keys while the performance information of the tracks 1–8 is automatically reproduced as a musical tone signal.

d3: Left hand guide mode

Assuming that the mode data MOD has been set as "2" to operate the electronic musical instrument at a left hand guide mode, the CPU 50 executes the processing at step 509–511 based on determination at step 505 after executed the processing at step 501–504 of the automatic performance start routine of FIG. 10 in the same manner as described above. In this instance, the CPU 50 sets at step 501 the reading pointer of the track 1 to the forefront address of the track in the fingering memory 30c and sets the reading pointer of the remaining tracks 0, 2–8 to the forefront address of the respective tracks in the performance information memory 30a. During execution of processing at step 509–511, the key-code and finger number FN of the first key-event data related to the track 1 are read out, and fingering indication for the left hand is effected on a basis of the read out key-code and finger number FN. In addition, the read out key-code is set as the automatic key-code AKC(1). In the fingering indication for the left hand, the light emitting elements 10b corresponding with the keys defined by the key-code are lighted in red, the 5-F pieces of the left-hand light emitting elements 10b adjacent the light emitting elements lighted in red are lighted in blue, and the FN–1 pieces of the right-hand light emitting elements adjacent the light emitting elements lighted in red are lighted in blue.

At this left hand guide mode, the CPU 50 executes the interruption program of FIG. 11 at each time when applied with the interruption signal from the timer 53 and maintains the automatic performance and the fingering indication. Provided that at this mode the performance information memorized in the tracks 0, 2–8 of the performance information memory 30a is reproduced as a musical tone signal, and the fingering indication is controlled in accordance with the performance information memorized in the track 1 of the fingering memory 30c. Accordingly, during execution of the processing at step 658–667 of the reproduction routine of FIG. 12, only the processing for the track 1 and the left hand is effected in stead of the processing for the track 0 and the right hand at the right hand guide mode. During execution of the processing at step 205–215 of the key-event routine of FIG. 6, only the processing for the track 1 and the left hand is effected.

As a result, if the timing of key depression at the left hand is coincident with or earlier than the timing of the automatic performance, fingering indication is effected before one note. When an indicated key is depressed by the player, the key-code of the depressed key is written into the performance key code list PKCL. When the automatic performance is conducted at the original timing, fingering indication for the left hand is effected with respect to the following note, the performance key code list PKCL is reset, and the automatic performance progresses at a predetermined speed. If the timing of key depression at the left hand is later than the timing of the automatic performance, fingering indication for the left hand is effected before one note, and the automatic performance is stopped at the timing of key depression for the note. When the indicated key is depressed after stopping of the automatic performance, fingering indication for the following note is effected at the timing of key depression, and the automatic performance is restarted.

As described above, the fingering indication for the left hand at the left hand guide mode is effected before one note prior to the original timing. Accordingly, when the player depresses the keys in dependence upon the fingering indication, a musical tone signal is produced, and the performance information of the tracks 0, 2–8 is automatically reproduced.

d4: Both Hands Guide Mode

Assuming that the mode data MOD has been set as "3" to operate the electronic musical instrument at a both hands guide mode, the CPU 50 executes the processing at step 509–511 based on determination at step 505 after executed the processing at step 501–504 of the automatic performance start routine of FIG. 10 in the same manner as described above. Provided that at step 501 the reading pointer of the tracks 0, 1 is set to the forefront address of the respective tracks in the fingering memory 30c and the reading pointer of the remaining tracks 2–8 is set to the forefront address of the respective tracks in the performance information memory 30a. During processing at step 509–511, the key-code and finger number FN of the first key-event data respectively related to the tracks 0, 1 are read out, and fingering indication for the right and left hands is effected on a basis of the key-codes and finger numbers FN. In addition, the key-codes are set as the automatic key-codes AKC(0), AKC(1), respectively.

At the both hands guide mode, the CPU 50 executes the interruption program of FIG. 11 at each time when applied with the interruption signal from the timer 53 and effects the automatic performance and the fingering indication. Provided that at this mode the performance information memorized in the tracks 2–8 of the performance information memory 30a is reproduced as a musical signal and the fingering indication is controlled in accordance with the performance information memorized in the tracks 0, 1 of the fingering memory 30c. Accordingly, processing for the tracks 0, 1 and the both hands is executed at step 658–667 of the reproduction routine of FIG. 12 and is also executed at step 205–215 of the key-event routine of FIG. 6.

As a result, if the timing of key depression at the both hands is coincident with or earlier than the timing of the automatic performance, the fingering indication is effected for a preceding note. When an indicated key is depressed, the key-code indicative of the depressed key is written into the performance key code list PKCL. When the automatic performance is effected at the original timing, fingering indication for the following note is effected, the performance key code list PKCL is reset and the automatic performance progresses at a predetermined speed. If the timing of key depression at either one of the both hands is later than the timing of the automatic performance, the automatic performance is temporarily stopped by determination at step 601, and the fingering indication for the following note and clear of the performance key code list PKLC are temporarily stopped by processing at step 211 of FIG. 11 and step 665 of FIG. 12. At the both hands guide mode, the performance key code list PKLC is use in common for the right and left hands.

As described above, the fingering indication for the right and left hands at the both hands guide mode is effected before one note from the original timing. When the player depresses the keys in dependence upon the fingering indication, a musical tone signal is produced in accordance with the key depression, and the performance information of the tracks 2–8 is automatically reproduced as a musical tone signal.

Hereinafter, certain modifications of the above embodiment will be described.

a: First Modification

A first modification of the above embodiment is modified to produce the finger number FN directly from the performance information memorized in the performance information memory 30b. In this modification, the program memory 51 is arranged to memorize the main program without the character analysis routine at step 107 shown in FIGS. 5 and 7 and to memorize the fingering analysis routine of FIG. 13 in stead of the fingering analysis routine of FIG. 8. Thus, the character memory 30b is not used in this modification. The program memory 51 is further arranged to store tables for the right and left hands in stead of the first and second fingering tables PBLA, LALB shown in FIGS. 3(A) and 3(B). As shown in FIG. 15, the tables for the right and left hands each are in the form of a data format in which a difference or interval between the current tone pitch and the following tone pitch (the difference in tone pitch being represented as a half note unit where a descending side is defined as a positive value while an ascending side is defined as a negative value), the current finger number, the current key, the following key number are listed. In the data format, the accurate degree of the following finger number is represented in the form of a score at each finger number, where the score is indicated by a large value when the accurate degree is high. The word "any" in the term of the current key means that any kind of keys may be depressed, the word "Other" represents all the keys which do not belong to the current keys in each combination of the tone pitch difference and the current finger number. In addition, the word "None" in each score of the following finger numbers represents impossibility of the fingering.

Figure 13:
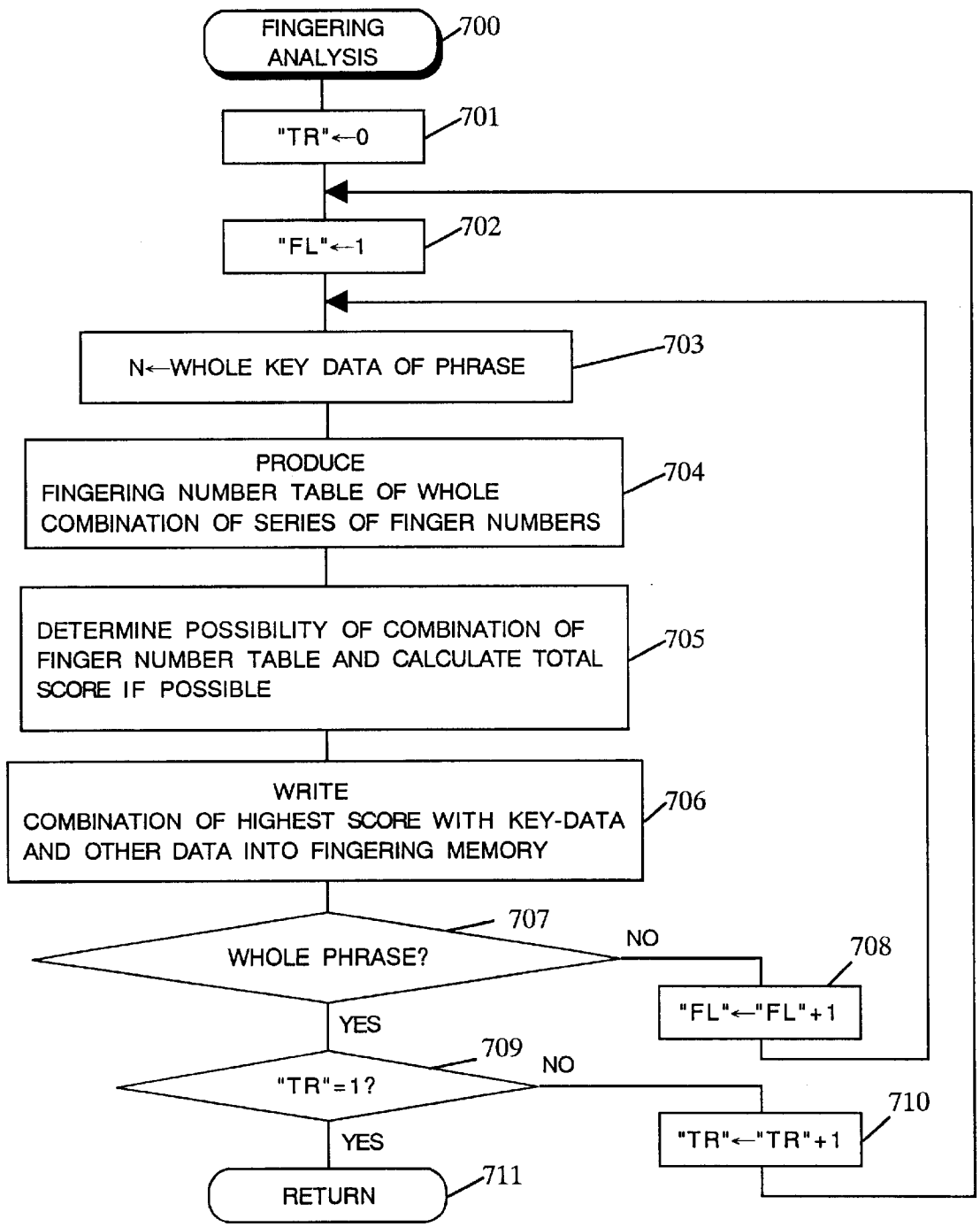
FIG. 13 is a flow chart of a fingering analysis routine in a modification of the present invention.

Assuming that the analysis operation element of the operation panel has been operated in this modification, the CPU 50 determines a "Yes" answer at step 106 of FIG. 5 and executes the fingering analysis routine at step 108. As shown in FIG. 13, the CPU 50 starts at step 700 to execute the fingering analysis routine and sets at step 701 the track number TR as "0". At the following step 702, the CPU 50 sets the phrase number FL as "1" and executes processing at step 703–706 to determine a finger number FN for the performance information of the phrase designated by the phrase number FL. At step 703, the CPU 50 counts the number of the key-event data included in the performance information of the phrase designated by the phrase number F1 and sets the count value as the number N of notes. At step 704, the CPU 50 produces a combination table of finger numbers at the working memory 51 on a basis of assumption of a whole combination of the finger numbers (1–5) for the number N of notes. Thus, the CPU 50 writes combinations of $5^N$ into the combination table of finger number as shown in FIG. 14. At step 705, the CPU 50 applies a score to each combination in the combination table based on the key-code in the key-event data and the finger number in the combination table and with reference to the table for the right hand shown in FIG. 15.

Hereinafter, the processing at step 705 will be further described in detail. At step 705, the CPU 50 reads out first and second key-event data of a phrase designated by the phrase number FL from the performance information memory 30a to read out key-codes of the first and second key-event data and reads out first and second finger numbers from a first combination in the combination table of finger numbers produced in the working memory 51. Subsequently, the CPU 50 calculates a tone pitch difference from the read out two key-codes to determine the current key based on the second key-code and sets the first and second finger numbers as the current and following finger numbers. Thus, the CPU 50 finds a combination of the tone pitch difference, the current key and the finger numbers from the combination table for the right hand to temporarily memorize a score corresponding with the combination.

After memorized the score of the first two notes, the CPU 50 reads out the second and third key-event data of the same phrase from the performance information memory 30a to read out key-codes of the second and third key-event data and reads out the second and third finger numbers from the first combination in the combination table of finger numbers. Subsequently, the CPU 50 calculates a second tone pitch difference from the two key-codes to determine the current key based on the third key-code and sets the second and third finger numbers as the current and following key numbers. Thus, the CPU 50 finds a combination of the second tone pitch difference, the current key and the finger numbers to add a score corresponding with the combination to the memorized score.

In such a manner as described above, the CPU 50 successively reads out two key-codes in a pair belonging to the phrase designated by the phrase number from the performance information memory 30a and reads out two finger numbers in a pair from the combination table. Thus, the CPU 50 accumulates scores concerned with the first combination in the combination table of finger numbers based on the tone pitch difference, the current key, and the current and following finger numbers with reference. When a final score concerned with the first combination has been added to the accumulated scores, the CPU 50 writes a total of the accumulated scores into the first combination column in the combination table of finger numbers. (see FIG. 14) In this instance, if a combination found out from the table for the right hand represents impossibility, the CPU 50 writes a code indicative of impossibility into the first combination column. After the processing for the first combination in the combination table of finger numbers has finished, the CPU 50 executes processing for a second combination in the same manner as described above. When processing for all the combinations has finished, all the total scores corresponding with all the combinations of finger numbers are written into the combination table of finger numbers.

At step 706, the CPU 50 searches a highest score from the memorized scores in the combination table of finger numbers and read out a combination of finger numbers corresponding with the highest score from the combination table of finger numbers. Thus, the CPU 50 successively reads out performance information of the phrase designated by the phrase number from the performance information memory 30a and writes the read out finger numbers into the fingering memory 30c after a gate time in the read out performance information. As a result, the fingering memory 30c stores therein the performance information which includes the finger numbers FN written into the key-event data of the phrase designated by the phrase number FL.

After processing at step 706, the CPU 50 determines a "No" answer at step 707 until the end code is written into the fingering memory 30c from the performance information memory 30a. During such determination at step 707, the CPU 50 increases the phrase number FL with "1" and returns the program to step 703 to repeat processing at step 703–706. When performance information of all the phrases is written into the fingering memory 30c, the CPU 50 determines a "Yes" answer at step 707 and determines at step 709 whether the track number TR is "1" or not. Since in this instance, the track number TR is "1", the CPU 50 determines a "No" answer at step 709 and causes the program to proceed to step 710. In turn, the CPU 50 adds "1" to the track number TR at step 710 and returns the program to step 702. While the track TR is maintained as "1", the CPU 50 executes processing at step 702–708 to apply the finger number FN to performance information of the track 0 in the performance memory 30a thereby to memorize the finger number FN in the fingering memory 30c. When the performance information of the track 0 including the finger number FN has been memorized in the fingering memory 30c, the CPU 50 determines a "Yes" answer at step 709 and finishes execution of the fingering analysis routine at step 711.

With such execution of the fingering analysis routine, the performance information of the tracks 0, 1 is applied with the finger numbers and memorized in the fingering memory 30c. Although in this modification, each combination of the finger numbers has been determined by a combination of highest scores, a combination of finger numbers may be selected from the memorized scores higher than a predetermine score. Furthermore, scores of the tables for the right and left hands may be changed in accordance with a performance tempo or the size of the player's hands.

b: Second modification

Figure 16:
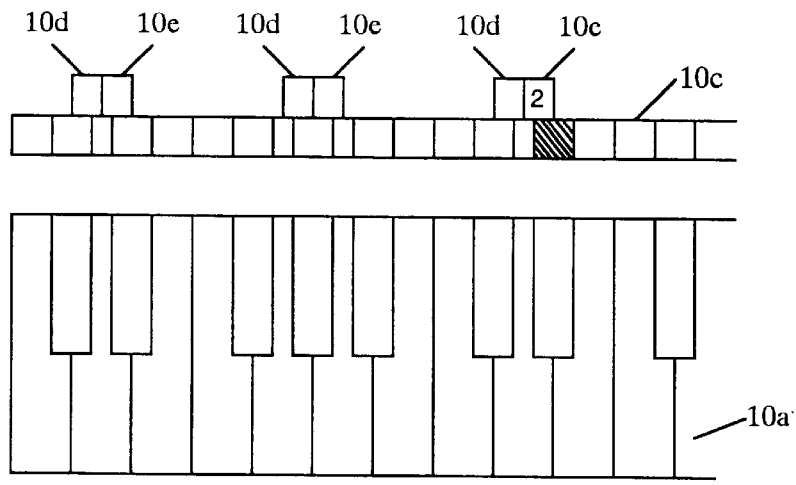
FIG. 16 is a plan view of a keyboard in another modification of the present invention.

In this modification, as shown in FIG. 16, a plurality of luminous elements 10c arranged in a line at positions located above the keys 10a, and a pair of numerical indicators 10d, 10e are arranged above the luminous elements 10c at laterally spaced plural places. The left-hand numerical indicators 10d indicate finger numbers of the left hand, while the right-hand numerical indicators 10e indicate finger numbers of the right hand. In operation of this modification, the luminous element 10c corresponding with a key designated by the key-code read out from the fingering memory 30c is lighted by processing at step 214 of FIG. 6, step 507, 510, 513 of FIG. 10 and step 663 of FIG. 12, and the numerical indicators 10d, b0e are turned on by the processing to indicate a finger number designated by the key-code read out from the fingering memory 30c at each of the tracks 0, 1. The luminous element 10c and numerical indicators 10d, 10e are turned off by processing at step 210 of FIG. 6.

Figure 17:
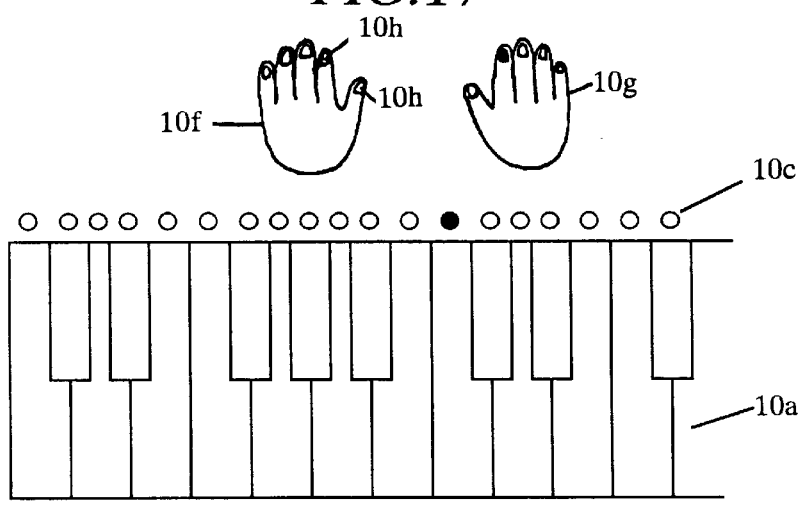
FIG. 17 is a plan view of a keyboard in a further modification of the present invention.

The second modification may be modified as shown in FIG. 17, wherein the luminous elements 10c are arranged in a line at positions located above the keys 10a, and pictures of the left and right hands painted on an appropriate place above the luminous elements 10c are provided with a luminous element 10h at each finger thereof. In operation of this modification, the luminous element 10c corresponding with a key designated by the key-code read out from the fingering memory 30c is lighted by processing at step 214 of FIG. 6, step 507, 510, 513 of FIG. 10 and step 663 of FIG. 12, and the luminous element 10h of a finger designated by the finger number FN corresponding with the key-code is lighted by the processing. The luminous elements 10c, 10h are turned off by processing at step 210 of FIG. 6.

Figure 18:
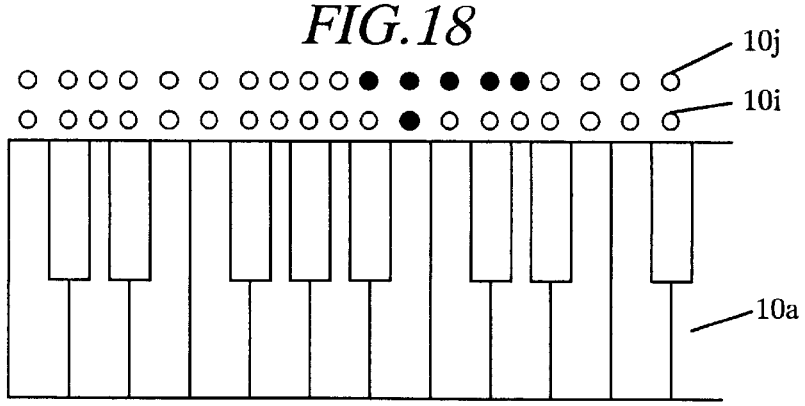
FIG. 18 is a plan view of a keyboard in a still further modification of the present invention.

The second modification may be further modified as shown in FIG. 18, wherein a plurality of luminous elements 10i, 10j are arranged in two parallel lines at positions located above the keys 10a. In operation of this modification, the luminous element 10i corresponding with a key designated by the key-code read out from the fingering memory 30c is lighted by processing at step 214 of FIG. 6, step 507, 510, 513 of FIG. 10 and step 663 of FIG. 12, and the luminous elements 10j designated by finger numbers FN corresponding with the key-code are lighted by the processing. The luminous elements 10i, 10j are turned off by processing at step 210 of FIG. 6. Alternatively, the luminous elements 10c or 10i may be embedded in the keys 10a, respectively.

Although in the above embodiment shown in FIG. 2, the luminous elements 10b corresponding with keys to be depressed are lighted in red and the luminous elements 10b for indication of the finger positions are lighted in blue, the luminous elements 10b may be lighted in different color or intermittently lighted to indicate the keys and fingers.

c: Other modifications

In the above embodiment, the performance information memorized in the flexible disc is applied with the character data after temporarily transferred to the performance memory 30a and memorized again in the character memory 30b to produce finger information based on the character data and memorize the finger information in the fingering memory 30c for fingering indication. In case the calculation speed is in time for the foregoing processing, the performance information may be applied with the fingering information at the same time when read out from an external memory medium such as the flexible disc FD for producing the fingering information in a real time. Furthermore, only the character data and finger number may be memorized in another memory in such a manner as to correspond with each key-code in the performance information memory 30a so that the finger number is read out from the memory in reproduction of the performance information. As the external record medium, a hard-disc, an optical disc or a memory in another computer can be adapted.

Although in the above embodiment and first modification, the phrase-code is preliminarily included in the performance information memorized in the flexible disc and performance information memory 30a for determination of the finger number, the phrase-code may be inserted by the player into the performance information. Alternatively, the phrase may be automatically inserted into the performance information by program analysis. In such a case, it is able to insert the phrase-code after a pause more than note length defined by a performance tempo or insert the second or fourth measure as a unit. In the case that a staccato is included in the performance information, the phrase-code may be inserted before the staccato.

Although in the above embodiment, the fingering information for the right hand has been analyzed separately from the fingering information for the left hand, the fingering information for the both hands may be analyzed at the same time. Although in the above embodiment, a single tone part has been adapted to the right and left hands, plural tone parts may be adapted to the right and left hands to analyze finger numbers for depression of plural keys. In this case, the first fingering table TBLA is arranged to provide table data for all the combination of prior finger numbers.

Although in the above embodiment, a priority has been finally given to a combination of fingers to be crossed latest in the occurrence of fingering impossibility or finger crossing in the phrase, a priority may be given to a combination of fingers to be crossed smallest times in the phrase.

Although in the above embodiment, reproduction of the automatic performance and progression of the fingering indication has been temporarily stopped until a correct key is depressed, the reproduction of the automatic performance and fingering indication may be progressed at a predetermined speed even when a key to be depressed is not depressed.

The present invention may be adapted to an automatic performance apparatus wherein only the tone pitch information (the key-event data) is memorized as the performance information without the tone length information (the duration-event data) in the musical note information. In such a case, finger numbers for indication of performance fingers may be added to the tone pitch information on basis of a series of tone pitch information. The present invention may be adapted to an automatic performance apparatus provided with only the fingering indication apparatus. The fingering information may be produced by a personal computer to indicate the fingering on a display of the computer.

Although in the above embodiment the analysis of finger numbers has been conducted with reference to the table, the analysis of finger numbers may be conducted by algorism or calculation. Furthermore, the program for the character analysis and fingering analysis may be stored in an external record memory such as the flexible disc to conduct the character analysis and fingering analysis.

What is claimed is:

1. An electronic musical instrument comprising:

a plurality of performance operation elements to be operated by a player;

means for supplying tone pitch information indicative of each tone pitch of a series of musical notes;

analysis means for automatically analyzing the tone pitch information supplied thereto and for producing finger information indicative of a performance finger of the player to be used for each of the musical notes based on the analyzed tone pitch information; and indication means for visually indicating a selected performance element from the plurality of performance elements to be operated by the player with the performance finger on a basis of the produced finger information;

wherein said analysis means includes determination means for determining plural kinds of finger information each of which indicates a combination of a plurality of finger numbers corresponding to the musical notes and finger-crossing detection means for detecting at least one finger crossing in the plural kinds of finger information and for selecting, as an optimum finger information, one of the plural kinds of finger information information in which a first finger cross is detected at a latest point in comparison with first finger crossings of the remaining plural kinds of finger information.

2. An electronic musical instrument as claimed in claim 1, wherein said analysis means comprises means for producing the finger information based on tone pitch information that is continual in time series.

3. An electronic musical instrument as recited in claim 2, wherein said analysis means comprises means for producing the finger information based on variation of the tone pitch information that is continual in time series.

4. An electronic musical instrument comprising:

a plurality of performance operation elements to be operated by a player;

means for supplying tone pitch information indicative of each tone pitch of a series of musical notes;

analysis means for automatically analyzing the tone pitch information supplied thereto and for producing position information indicative of a position where the player's hand is placed with respect to the performance operation elements for performance of the musical notes on a basis of the analyzed tone pitch information said analysis means including determination means for determining a finger number indicative of a performance finger of the player to be used for each of the musical notes based on the supplied tone pitch information; and indication means for visually indicating the position where the player's hand is placed with respect to the performance operation elements for performance of the musical notes on a basis of the produced position information;

wherein said indication means indicates a performance operation element to be operated by the player in a first indication manner and indicates at least two performance operation elements left and/or right to the performance operation element in a second indication manner so as to indicate a position where the player's hand should be placed for performance of the series of musical notes, and where the performance operation elements indicated in the second indication manner are determined in response to the determined finger number so that the performance operation element indicated in the first indication manner represents the finger number to be used.

* * * * *